US012742647B2

(12) United States Patent
O'Connor et al.

(10) Patent No.: US 12,742,647 B2
(45) Date of Patent: Sep. 22, 2026

(54) COMMUNICATION OF FILL LEVEL TO RECEIVING VEHICLE(S)

(71) Applicant: Deere & Company, Moline, IL (US)

(72) Inventors: Kellen O'Connor, Clive, IA (US); Jeremy J. Faust, Grimes, IA (US)

(73) Assignee: Deere & Company, Moline, IL (US)

(*) Notice: Subject to any disclaimer, the term of this patent is extended or adjusted under 35 U.S.C. 154(b) by 903 days.

(21) Appl. No.: 17/360,282

(22) Filed: Jun. 28, 2021

(65) Prior Publication Data

US 2022/0410704 A1 Dec. 29, 2022

(51) Int. Cl.

| | |
|---|---|
| ***G01C 21/34*** | (2006.01) |
| ***B60K 35/10*** | (2024.01) |
| ***B60K 35/22*** | (2024.01) |
| ***B60K 35/28*** | (2024.01) |

(52) U.S. Cl.

CPC .......... *G01C 21/3407* (2013.01); *B60K 35/10* (2024.01); *B60K 35/22* (2024.01); *B60K 35/28* (2024.01); *B60K 2360/166* (2024.01); *B60K 2360/168* (2024.01); *B60K 2360/171* (2024.01); *B60K 2360/21* (2024.01)

(58) Field of Classification Search

CPC .... G01C 21/3407; B60K 35/22; B60K 35/28; B60K 2360/166; B60K 2360/168; B60K 2360/171; B60K 2360/21; A01D 41/1275; A01D 43/073; G01F 22/00

See application file for complete search history.

(56) References Cited

U.S. PATENT DOCUMENTS

| | | | |
|---|---|---|---|
| 4,068,223 | A | 1/1978 | Steffen |
| 4,529,348 | A | 7/1985 | Johnson et al. |
| 5,575,316 | A | 11/1996 | Poliklas |
| 5,749,783 | A | 5/1998 | Pollklas |
| 5,957,773 | A | 9/1999 | Olmsted et al. |
| 6,097,425 | A | 8/2000 | Bahnke et al. |
| 6,216,071 | B1 | 4/2001 | Motz |
| 6,587,772 | B2 | 7/2003 | Behnke |
| 7,877,181 | B2 | 1/2011 | Chervenka et al. |

(Continued)

FOREIGN PATENT DOCUMENTS

| | | |
|---|---|---|
| DE | 19647522 A1 | 5/1998 |
| DE | 202012103730 U1 | 10/2012 |

(Continued)

OTHER PUBLICATIONS

Extended European Search Report and Written Opinion issued in European Patent Application No. 22177644.6, dated Nov. 25, 2022, in 08 pages.

(Continued)

*Primary Examiner* — Khoi H Tran
*Assistant Examiner* — Trang Dang
(74) *Attorney, Agent, or Firm* — Christopher J. Volkmann; KELLY, HOLT & CHRISTENSON PLLC

(57) ABSTRACT

An automatic fill control system on a material loading vehicle generates an output indicative of a current fill level of a receiving vehicle into which the material loading vehicle is loading material. A fill level processing system generates a fill parameter indicative of when the receiving vehicle will reach a target capacity. The fill parameter is communicated to a mobile application on a mobile device in a receiving vehicle.

13 Claims, 14 Drawing Sheets

(56) References Cited

U.S. PATENT DOCUMENTS 8,126,620 B2 2/2012 Ringwald et al.
8,499,537 B2 8/2013 Correns et al.
8,868,304 B2 10/2014 Bonefas
9,002,591 B2 4/2015 Wang et al.
9,043,096 B2 5/2015 Zielke et al.
9,107,344 B2 8/2015 Madsen et al.
9,119,342 B2 9/2015 Bonefas
9,139,091 B1 9/2015 Penilla et al.
9,188,986 B2 11/2015 Baumann
9,468,145 B2 10/2016 Coppinger et al.
9,642,305 B2 5/2017 Nykamp et al.
9,714,856 B2 7/2017 Myers
9,949,435 B2 4/2018 Banks, Jr. et al.
9,949,462 B2 4/2018 Zimmerman
9,973,710 B2 5/2018 Boydens et al.
10,252,729 B1 4/2019 Goldman-Shenhar
10,264,723 B2 4/2019 Gresch et al.
10,299,433 B2 5/2019 Biggerstaff et al.
10,368,488 B2 8/2019 Becker et al.
10,609,864 B2 4/2020 Conrad et al.
10,830,634 B2 11/2020 Blank et al.
10,834,872 B2 11/2020 Farley et al.
11,178,818 B2* 11/2021 Brammeier .......... G05D 1/0212
2002/0082757 A1 6/2002 Behnke
2002/0083695 A1 7/2002 Behnke et al.
2002/0133309 A1* 9/2002 Hardt ................. A01D 41/1277 702/129
2003/0174207 A1 9/2003 Alexia et al.
2004/0004544 A1 1/2004 Knutson
2006/0025894 A1 2/2006 O'Connor et al.
2006/0240884 A1 10/2006 Klimmer
2007/0135190 A1 6/2007 Diekhans
2008/0083475 A1 4/2008 Lamb
2009/0006569 A1 1/2009 Morss et al.
2009/0044505 A1 2/2009 Huster et al.
2010/0042297 A1 2/2010 Foster et al.
2010/0066517 A1 3/2010 Posselius et al.
2010/0266377 A1 10/2010 Yoder
2010/0285855 A1 11/2010 Chervenka et al.
2010/0332051 A1* 12/2010 Kormann ................ A01F 12/46 701/2
2011/0061762 A1 3/2011 Madsen et al.
2011/0213531 A1 9/2011 Farley
2011/0307149 A1* 12/2011 Pighi .................... A01D 43/087 700/218
2012/0021386 A1 1/2012 Anderson et al.
2012/0200697 A1* 8/2012 Wuestefeld .............. H04N 7/18 198/810.01
2012/0215381 A1 8/2012 Wang et al.
2012/0215394 A1 8/2012 Wang et al.
2012/0215409 A1 8/2012 Wang et al.
2012/0221213 A1 8/2012 Seeger
2012/0263560 A1 10/2012 Diekhans et al.
2012/0265412 A1 10/2012 Diekhans et al.
2012/0302299 A1 11/2012 Behnke et al.
2013/0096782 A1 4/2013 Good et al.
2013/0166344 A1 6/2013 Grothaus et al.
2013/0214939 A1 8/2013 Washlow et al.
2013/0231823 A1 9/2013 Wang et al.
2014/0082442 A1 3/2014 Whetsel
2014/0083556 A1* 3/2014 Darr ..................... A01D 43/087 141/95
2014/0113694 A1 4/2014 Coppinger et al.
2014/0164394 A1 6/2014 Maru et al.
2014/0224377 A1 8/2014 Bonefas
2014/0311113 A1* 10/2014 Bonefas ............... A01D 34/001 56/10.2 R
2014/0338298 A1* 11/2014 Jung .................... A01D 41/127 56/10.2 R
2015/0168187 A1 6/2015 Meyers
2015/0245560 A1 9/2015 Middelberg et al.
2015/0264866 A1 9/2015 Foster et al.
2015/0308070 A1 10/2015 Deines
2016/0009509 A1 1/2016 Bonefas et al.
2016/0348324 A1 12/2016 Engelmann et al.
2017/0009408 A1* 1/2017 Marsolek .............. E01C 23/065
2017/0042088 A1 2/2017 Nykamp et al.
2017/0082442 A1 3/2017 Anderson
2017/0088147 A1 3/2017 Tentinger et al.
2017/0193713 A1 7/2017 So et al.
2017/0208742 A1 7/2017 Ingibergsson et al.
2017/0336787 A1 11/2017 Pichimaier et al.
2018/0022559 A1 1/2018 Knutson
2018/0334136 A1 11/2018 Chaston et al.
2019/0261560 A1* 8/2019 Jelenkovic ............. H04N 23/90
2019/0261561 A1 8/2019 Heitmann
2019/0332987 A1* 10/2019 Marsolek ........... G06Q 10/0637
2020/0073543 A1 3/2020 Koch et al.
2020/0090094 A1* 3/2020 Blank .................... G06Q 50/02
2020/0128740 A1 4/2020 Suleman
2020/0133262 A1 4/2020 Suleman et al.
2020/0178049 A1* 6/2020 Suleman ............... H04W 12/64
2020/0214205 A1 7/2020 De Smedt et al.
2020/0319655 A1 10/2020 Desai et al.
2020/0325655 A1* 10/2020 Hageman ............. E02F 3/3486
2020/0339132 A1 10/2020 Swift et al.
2022/0019240 A1 1/2022 Christiansen et al.
2022/0122197 A1* 4/2022 Hanrieder ............ G05D 1/0044
2023/0247942 A1 8/2023 Jager et al.
2024/0037806 A1* 2/2024 Christiansen ...... A01D 41/1217

FOREIGN PATENT DOCUMENTS

DE 102019202950 A1 9/2019
EP 1977640 A1 10/2008
EP 1977640 B1 2/2011
EP 2311307 A1 4/2011
EP 2311307 B1 12/2011
EP 2510775 A1 10/2012
EP 2798939 A1 11/2014
EP 2929773 A1 10/2015
EP 2929773 81 1/2018
EP 3315006 A1 5/2018
EP 3315007 A1 5/2018
EP 3409097 A1 12/2018
EP 3643159 A1 4/2020
EP 3409097 B1 7/2020
EP 3760026 A1 1/2021
EP 3316218 B1 4/2021
WO 2011104085 A1 9/2011
WO 2015011237 A2 1/2015
WO 2016079580 A1 5/2016
WO 2020038810 A1 2/2020

OTHER PUBLICATIONS

U.S. Appl. No. 17/321,584 Office Action dated Oct. 31, 2022, 15 pages.
Extended European Search Report and Written Opinion Issued in European Patent Application No. 22159163.9, dated Aug. 3, 2022. in 07 pages.
Extended European Search Report and Written Opinion issued in European Patent Application No. 22177642.0, dated Nov. 11, 2022, in 08 pages.
U.S. Appl. No. 17/321,584 Non Final Office Action dated Feb. 13, 2023, 9 pages.
Extended European Search Report issued in European Patent Application No. 22170901.7, dated Feb. 24, 2023, 10 pages.
U.S. Appl. No. 17/321,584, filed May 17, 2021 Application and Drawings, 47 pages.
U.S. Appl. No. 17/210,691, filed Mar. 24, 2021, Application and Drawings, 60 pages.
U.S. Appl. No. 17/196,023, filed Mar. 9, 2021, Application and Drawings, 53 pages.
Extended European Search Report and Written Opinion issued in European Patent Application No. 22156203.6, dated Jul. 2022, in 11 pages.
U.S. Appl. No. 17/321,584 Final Office Action dated Aug. 15, 2022, 35 pages.

(56) References Cited

OTHER PUBLICATIONS

Extended European Search Report issued in European Patent Application No. 22159163.9, dated Aug. 3, 2022, 7 pages.
U.S. Appl. No. 17/321,584 Office Action dated May 11, 2022, 34 pages.
U.S. Appl. No. 17/321,584 Office Action dated Jan. 25, 2022, 24 pages.
U.S. Appl. No. 17/321,584 Office Action dated Sep. 17, 2021, 25 pages.
U.S. Appl. No. 17/360,291 Notice of Allowance dated Nov. 13, 2023, 5 pages.
U.S. Appl. No. 17/210,691 Non-Final Office Action dated Nov. 11, 2023, 8 pages.
Non Final Office Action for U.S. Appl. No. 17/196,023 dated Sep. 21, 2023, 20 pages.
Non Final Office Action for U.S. Appl. No. 17/321,584 dated Feb. 13, 2023, 9 pages.
Extended European Search Report issued in European Patent Application No. 22183092.0. dated Mar. 24, 2023, 10 pages.
Notice of Allowance for U.S. Appl. No. 17/360,291 dated Oct. 4, 2023, 9 pages.
U.S. Appl. No. 17/196,023, Notice of Allowance dated Jan. 23, 2024, 7 pages.
U.S. Appl. No. 17/210,691, Notice of Allowance dated Jan. 18, 2024, 7 pages.
Application and Drawings for U.S. Appl. No. 17/360,291, filed Jun. 28, 2021, 43 pages.
Application and Drawings for U.S. Appl. No. 17/386,975, filed Jul. 28, 2021, 54 pages.

* cited by examiner

COMMUNICATION OF FILL LEVEL TO RECEIVING VEHICLE(S)

FIELD OF THE DESCRIPTION

The present description relates to mobile work machines. More specifically, the present description relates to communicating a fill level to receiving vehicles.

BACKGROUND

There are a wide variety of different types of mobile work machines such as agricultural vehicles and construction vehicles. Some vehicles include harvesters, such as forage harvesters, sugar cane harvesters, combine harvesters, and other harvesters, that harvest grain or other crop. Such harvesters often unload into carts which may be pulled by tractors or semi-trailers as the harvesters are moving. Some construction vehicles include vehicles that remove asphalt or other similar materials. Such machines can include cold planers, asphalt mills, asphalt grinders, etc. Such construction vehicles often unload material into a receiving vehicle, such as a dump truck or other vehicle with a receiving vessel.

As one example, while harvesting in a field using a forage harvester, an operator attempts to control the forage harvester to maintain harvesting efficiency. At the same time, a haulage unit (such as a semi-truck or tractor-pulled cart) is often in position relative to the forage harvester (e.g., behind the forage harvester or alongside the forage harvester) so that the forage harvester can fill the haulage unit while moving through the field. The discussion above is merely provided for general background information and is not intended to be used as an aid in determining the scope of the claimed subject matter.

SUMMARY

An automatic fill control system on a material loading vehicle generates an output indicative of a current fill level of a receiving vehicle into which the material loading vehicle is loading material. A fill level processing system generates a fill parameter indicative of when the receiving vehicle will reach a target capacity. The fill parameter is communicated to a mobile application on a mobile device in a receiving vehicle.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
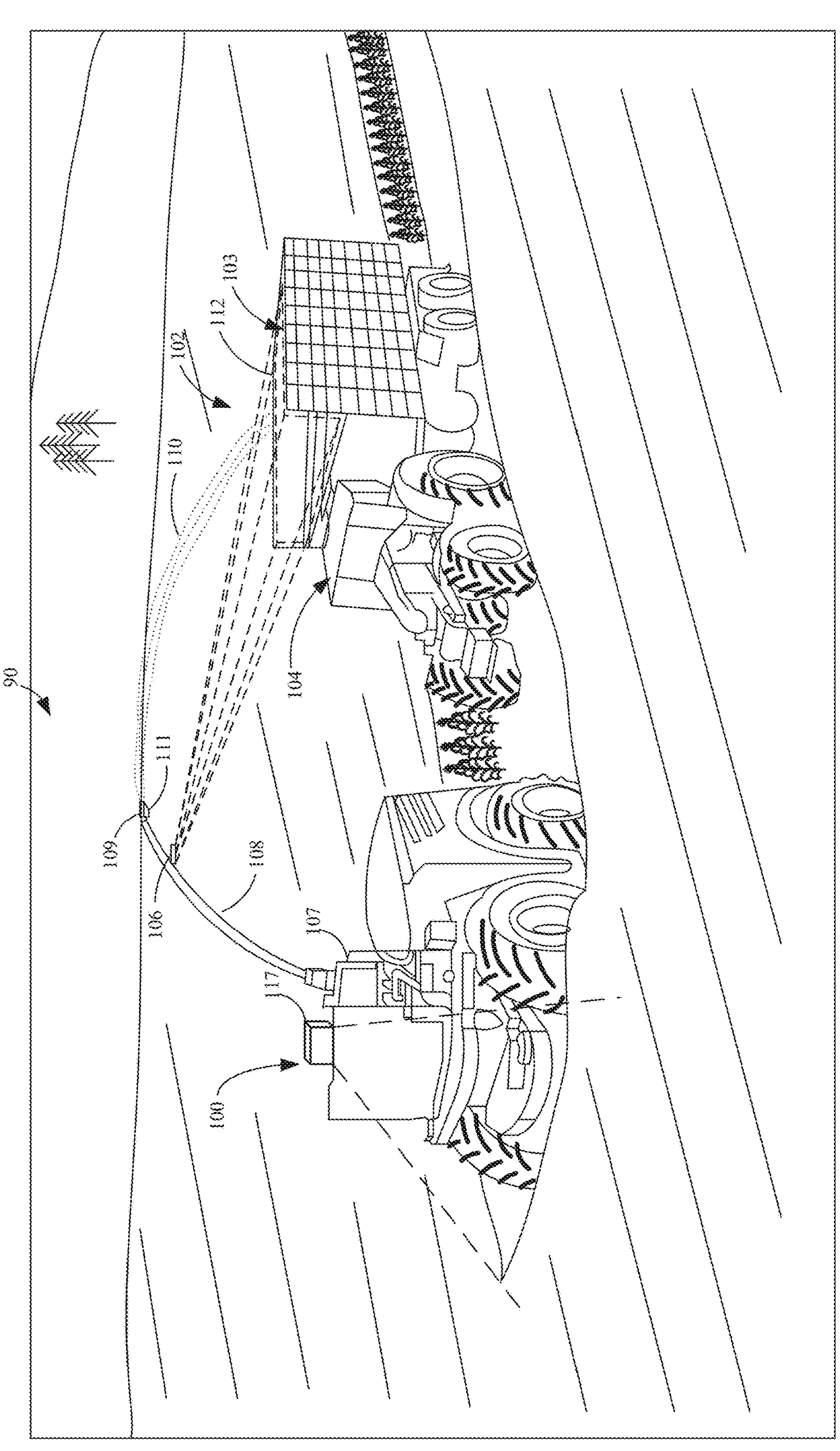
FIG. 1 is a pictorial illustration of one example of a work machine which comprises a forage harvester filling a receiving vehicle, with the receiving vehicle in a position behind the forage harvester.

The present discussion proceeds with respect to an agricultural harvester, but it will be appreciated that the present discussion is also applicable to construction machines as well, such as those discussed elsewhere herein. With these types of machines, logistical efficiency can be desirable. For instance, if a receiving vehicle that is receiving harvested material from a forage harvester reaches its full capacity at some point in the field, and there is no haulage unit nearby, then the forage harvester sits idle, waiting for a haulage unit to arrive. This increases the inefficiency of the forage harvester, and of the overall harvesting operation.

Similarly, in a given harvesting operation, there may be multiple different harvesters operating in a single field, along with multiple different haulage units. Thus, the haulage units may go to the wrong harvester. For instance, a haulage unit may go to a harvester which has a receiving vehicle which has not yet reached is full capacity, while a different harvester is sitting idle because it has no receiving vehicle into which to load material. This can also raise the inefficiency of the operation. Further, it may be that operators of the haulage units do not know when a particular receiving vehicle is reaching its capacity.

Other harvesters such as combine harvesters and sugar cane harvesters, can have similar difficulties. Also, construction vehicles that load material into a receiving vehicle can have similar problems.

It can thus be very difficult for an operator of an empty receiving vehicle to know where to go when approaching a field or after unloading material. The operator of the receiving vehicle does not know when or where the receiving vehicle(s) currently being filled by the harvester(s) will be full. Similarly, when there are multiple harvesters operating in a field, the operator of the empty receiving vehicle does not know which harvester will fill its current receiving vehicle first. This can result in inefficiencies.

In order to address issues encountered in filling a receiving vehicle, some automatic cart filling control systems have been developed to automate portions of the filling process. One such automatic fill control system uses a stereo camera on the spout of the harvester to capture an image of the receiving vehicle. An image processing system can determine dimensions of the receiving vehicle and the distribution of the crop deposited inside the receiving vehicle. The system also detects crop height within the receiving vehicle, in order to automatically aim the spout toward empty spots and control the flap position to achieve a more even fill, while reducing spillage. Such systems can fill the receiving vehicle according to a fill strategy (such as front-to-back, back-to-front, etc.) that is set by the operator or that is set in other ways.

The present description thus proceeds with respect to a material loading vehicle that detects a fill level of material in a receiving vehicle and then generates an estimate of a fill parameter indicative of where or when the receiving vehicle will reach a target capacity. The fill parameter is then communicated to a mobile application (mobile app) on one or more mobile devices on one or more other receiving vehicles so the operator(s) of the one or more other receiving vehicles can efficiently determine where to go on the field so the harvester can continue harvesting without significant interruption.

FIG. 1 is a pictorial illustration showing one example of a self-propelled forage harvester 100 filling a tractor-pulled grain cart (a haulage unit or receiving vehicle) 102. Cart 102 thus defines an interior that forms a receiving vessel 103 for receiving harvested material through a receiving area 112. In the example shown in FIG. 1, a towing vehicle 104 (a tractor in the illustrated example), that is pulling grain cart 102, is positioned directly behind forage harvester 100. Also, in the example illustrated in FIG. 1, forage harvester 100 has a camera 106 mounted on the spout 108 through which the harvested material 110 is traveling. The spout 108 can be pivotally or rotationally mounted to a frame 107 of harvester 100. Camera 106 can be a stereo-camera or a mono-camera that captures an image (e.g., a still image or video) of the receiving area 112 of cart 102. In the example shown in FIG. 1, the receiving area 112 is defined by an upper edge of the walls of cart 102.

When harvester 100 has an automatic fill control system that includes image processing, as discussed above, the automatic fill control system can receive a target landing point for the material in cart 102 and gauge the height of harvested material in cart 102. The automatic fill control system can control spout 108 and flap 109 to obtain an even fill throughout the entire length and width of cart 102, while not overfilling cart 102. An image processing system can identify how full cart 102 is. The automatic fill control system can then generate a fill parameter indicative of an estimate of when cart 102 will be full. For example, a flow rate sensor can sense a flow rate (e.g., volumetric flow rate) of material through harvester 100. Based on the current fill level of cart 102 and the flow rate the automatic fill control system can generate an output indicative of when cart 102 will be full, or a location where cart 102 will be full. In another example, forward looking camera 117 can capture an image (sill or video) of an area ahead of harvester 100 so the image processor can generate an estimate of the volume of material that harvester 100 will encounter. This volume can be used to generate a fill parameter as well. In other examples, the fill parameter can be based on the current fill level of cart 102 and a historic yield in the field ahead of the harvester 100 as well as the location, heading, and speed of harvester 100. These are only examples of how a fill parameter can be generated. The fill parameter can then be sent to a mobile app on a mobile device on other receiving vehicles. By automatically, it is meant, for example, that the operation is performed without further human involvement except, perhaps, to initiate or authorize the operation.

Figure 2:
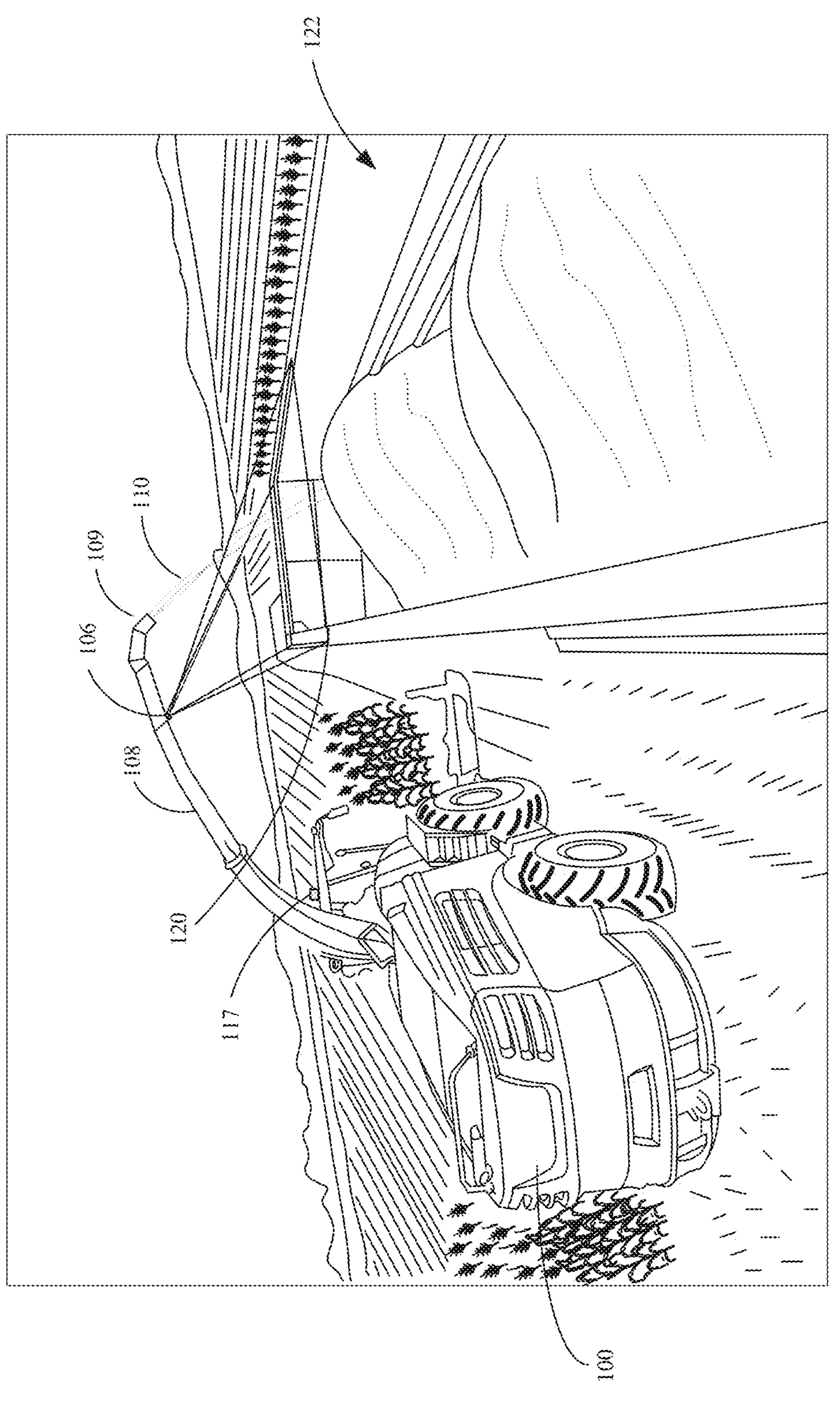
FIG. 2 is a pictorial illustration of one example of a work machine which comprises a forage harvester filling a receiving vehicle that is alongside the forage harvester.

FIG. 2 is a pictorial illustration showing another example of a self-propelled forage harvester 100, this time loading a semi-trailer (a haulage unit or a receiving vehicle) 122 in a configuration in which a semi-tractor is pulling semi-trailer 122 alongside forage harvester 100. An automatic fill control system detects a target landing point in receiving vehicle 122. The target landing point can be detected based on an operator input or an automated input or a default input. Therefore, the spout 108 and flap 109 are positioned to unload the harvested material 110 to fill trailer 122 at the target landing point according to a pre-defined side-by-side fill strategy. Again, FIG. 2 shows that camera 106 can capture an image (which can include a still image or video) of semi-trailer 122. In the example illustrated in FIG. 2, the field of view of camera 106 is directed toward the receiving area 120 of trailer 122 so that image processing can be performed to identify how full the trailer 122 is. The automatic fill control system can then generate the fill parameter indicative of when trailer 122 will be filled to a target capacity. For example, the fill parameter may be a time when trailer 122 will be filled to the target capacity, a location where trailer 122 will be filled to the target capacity, etc.). The fill parameter can then be sent to mobile apps on other receiving vehicles so the operators of the other receiving vehicles can best decide where to drive.

In some examples, where machine 100 is a combine harvester, it may be that the spout 108 is not moved relative to the frame during normal unloading operations. Instead, the relative position of the receiving vehicle 102, 122 and the combine harvester is changed in order to fill the receiving vessel 103 as desired. Thus, if a front-to-back fill strategy is to be employed, then the relative position of the receiving vessel, relative to the combine harvester, is changed so that the spout is first filling the receiving vessel at the front end, and then gradually fills the receiving vessel moving rearward. In such an example, the combine harvester and towing vehicle may have machine synchronization systems which communicate with one another. When the relative position of the two vehicles is to change, then the machine synchronization system on the combine harvester can send a message to the machine synchronization system on the towing vehicle to nudge the towing vehicle slightly forward or rearward relative to the combine harvester, as desired. By way of example, the machine synchronization system on the combine harvester may receive a signal from the fill control system on the combine harvester indicating that the position in the receiving vessel that is currently being filled is approaching its desired fill level. In that case, the machine synchronization system on the combine harvester can send a "nudge" signal to the machine synchronization system on the towing vehicle. The nudge, once received by the machine synchronization system on the towing vehicle, causes the towing vehicle to momentarily speed up or slow down, thus nudging the position of the receiving vessel forward or rearward, respectively, relative to the combine harvester.

Figure 3:
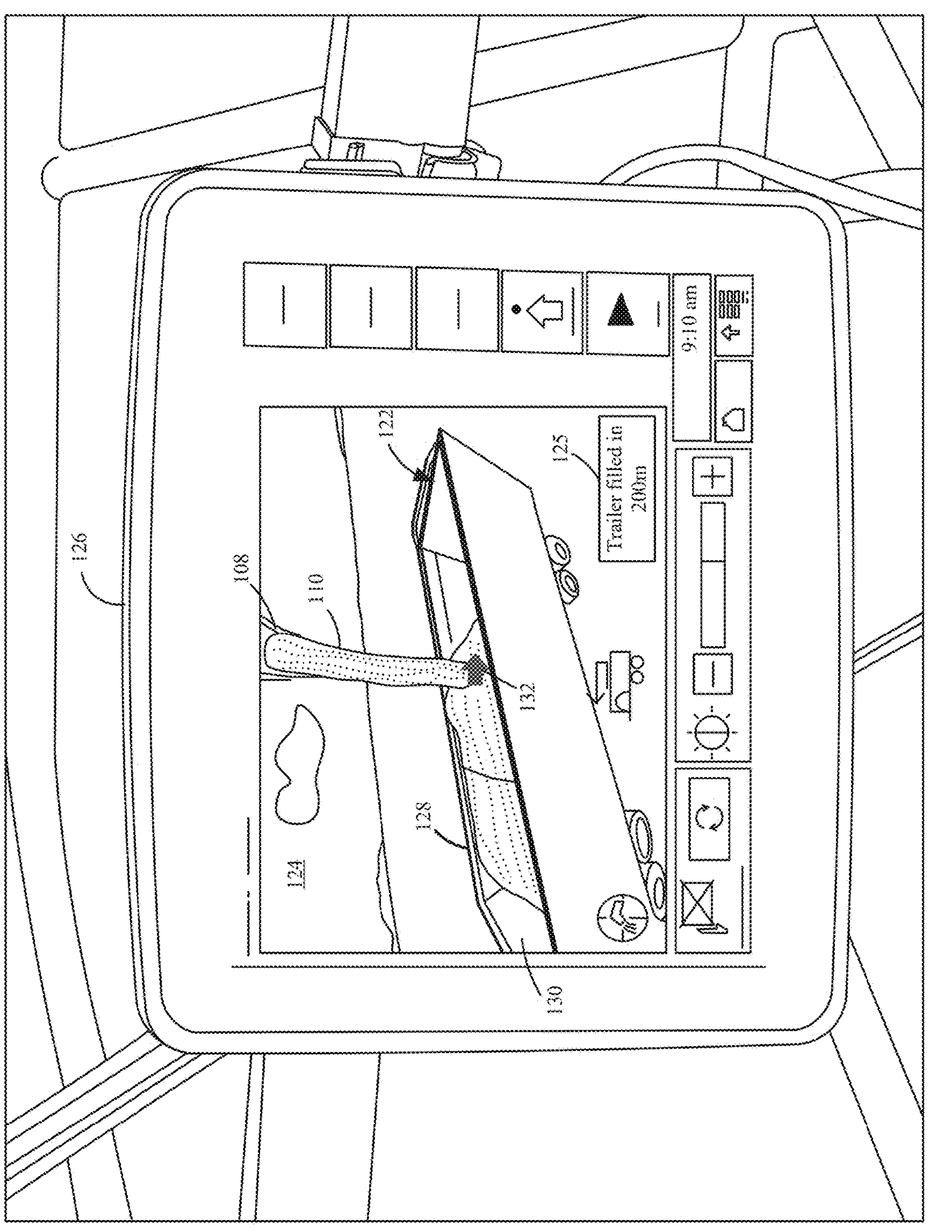
FIG. 3 is a pictorial illustration of an operator display showing video of a filling operation with the receiving vehicle in a position along side the forage harvester.

FIG. 3 is a pictorial illustration showing one example of an operator interface display 124 that can be displayed on a display mechanism 126, for the operator in an operator compartment of forage harvester 100. The operator interface display 124 in FIG. 3 shows a view of images (still or video) captured by camera 106 of material 110 entering trailer 122. An image processing system on harvester 100 illustratively identifies the perimeter of the opening 128 in trailer 122 as generally lying in a plane and also processes the image of the material 110 in trailer 122 to determine where the trajectory of material 110 intersects with the plane that opening 128 lies in to identify the actual (or current) landing point of material 110 in trailer 122. The image processor can also determine the fill height relative to opening 128 and the overall fill level of trailer 122 (such as the percentage of a target capacity to which trailer 122 is filled). The perimeter defining opening 128 can be visually enhanced by overlaying a visual overlay over the opening 128 so that the operator can easily identify the opening 128, as it is being recognized by the image processing system. The target landing point may be identified on display 124 by an indicator 132.

As mentioned, the target landing point may be input by the operator. For example, where the display screen on mechanism 126 is a touch sensitive display screen, then the operator may simply touch the screen in the area of the target landing point. The touch gesture is detected by the fill control system and the fill control system automatically generates control signals to move spout 108 so that it is depositing material 110 at the target landing point.

Generating the control signals to reposition spout 108 can be done in different ways. For instance, once the operator touches or otherwise selects (such as with a point and click device) an area of display 124, the control system identifies the pixel or pixel sets that were selected (e.g., touched or otherwise selected) and, from those pixels, identifies a corresponding physical area or landing point within trailer 122. The control system can then calculate the position that spout 108 needs to be in based on the density of the material 110 and the kinematics of the spout 108 and flap 109 and the velocity of the material 110 or estimated velocity of the material 110 as it exits the spout 108 in order to fill material 110 at that particular landing point in trailer 122.

It should also be noted that, in one example, forage harvester 100 may have an automatic fill control system (or active fill control system) which fills trailer 122 according to a fill strategy (such as a back-to-front fill strategy, front-to-back fill strategy, etc.). In that case, the indicator 132 may be displayed to show the current location where material 110 is being loaded (or is intended to be loaded) into trailer 122 through spout 108 and the direction that spout 108 will be moving relative to trailer 122 as the filling operation continues. It can be seen in FIG. 3, for instance, that indicator 132 is an arrow pointing in the front-to-back direction. The location of arrow 132 on the representation of trailer 122 indicates the target landing point, while the direction of the arrow indicates the direction that spout 108 will be moved relative to trailer 122 in executing the selected front-to-back fill strategy.

In one example, the automatic fill control system or a separate fill level processing system also determines a fill parameter indicative of when trailer 122 will be full. As discussed above, the automatic fill control system or separate system can receive an input indicative of the flow of material through harvester 100, or indicative of the estimated flow of material through harvester 100. The input may be based upon a view of the crop material ahead of harvester 100 generated by a forward looking camera 117. The estimated flow of material can be based upon an estimated crop yield ahead of harvester 100. The estimated yield can be based upon a current yield, or based upon historic yield from a same position in the field. The fill parameter may be an estimated time value indicative of when trailer 122 will reach its target capacity, or the fill parameter may be a distance value indicating a distance that harvester 100 will travel before trailer 122 reaches its target capacity. Similarly, the fill parameter can be generated based upon how long it took to fill trailer 122 to its current overall fill level. By way of example, if it took harvester 100 fifteen minutes to fill trailer 100 to a current overall fill level of 75% of its target capacity, then the automatic fill control system can generate the fill parameter to indicate that trailer 122 will likely be full in 5 minutes. Similarly, if the automatic fill control system or separate system receives an input indicating that harvester 100 filled trailer 122 to 75% of its target capacity after traveling 300 meters, then the automatic fill control system may generate the fill parameter to indicate that trailer 122 will be filled to its target capacity after harvester 100 travels an additional 100 meters. The fill parameter may be a location in a local or global coordinate system indicating a location where harvester 100 will be when trailer 122 reaches its capacity, or the fill parameter may be a different parameter.

Once the automatic fill control system or separate system generates the fill parameter, display 124 can display a fill parameter indicator 125. In the example shown in FIG. 3, the fill parameter indicator 125 is a distance value indicating how far harvester 100 will travel before trailer 122 reaches its target capacity. It will be appreciated that the fill parameter indicator 125 can be other values as well, such as a time value, a geographic location value, or any of a wide variety of other fill parameter values.

In one example, the automatic fill control system can also send the fill parameter to the receiving vehicle that is currently being loaded and to one or more other receiving vehicles that are not currently being loaded by harvester 100. Therefore, if there are empty receiving vehicles 11 that have been unloaded and are returning to the field or returning to harvester 100, and that have mobile devices that are running the mobile app, the fill parameter can be sent to the mobile app which can display the fill parameter to the operator(s) of the empty receiving vehicles. The operator(s) can then determine where to drive to most efficiently meet harvester 100 (or another harvester) when trailer 122 (or another haulage unit) reaches its target capacity. Similarly, there may be multiple harvesters operating in the same field. There may also be multiple different receiving vehicles so that when an operator of an empty receiving vehicle is returning to the harvesters, that operator may find it difficult to know which harvester will need the empty receiving vehicle first, and where that harvester will be when it needs the empty receiving vehicle. Thus, the mobile app may receive fill parameters from each of the multiple different harvesters, and those fill parameters may be displayed by the mobile app so that the operator of the empty receiving vehicle can choose to drive to the harvester that results in a most efficient route.

These are just some examples of how the operator interface display 124 can be generated. Others are described in more detail below.

Figure 4:
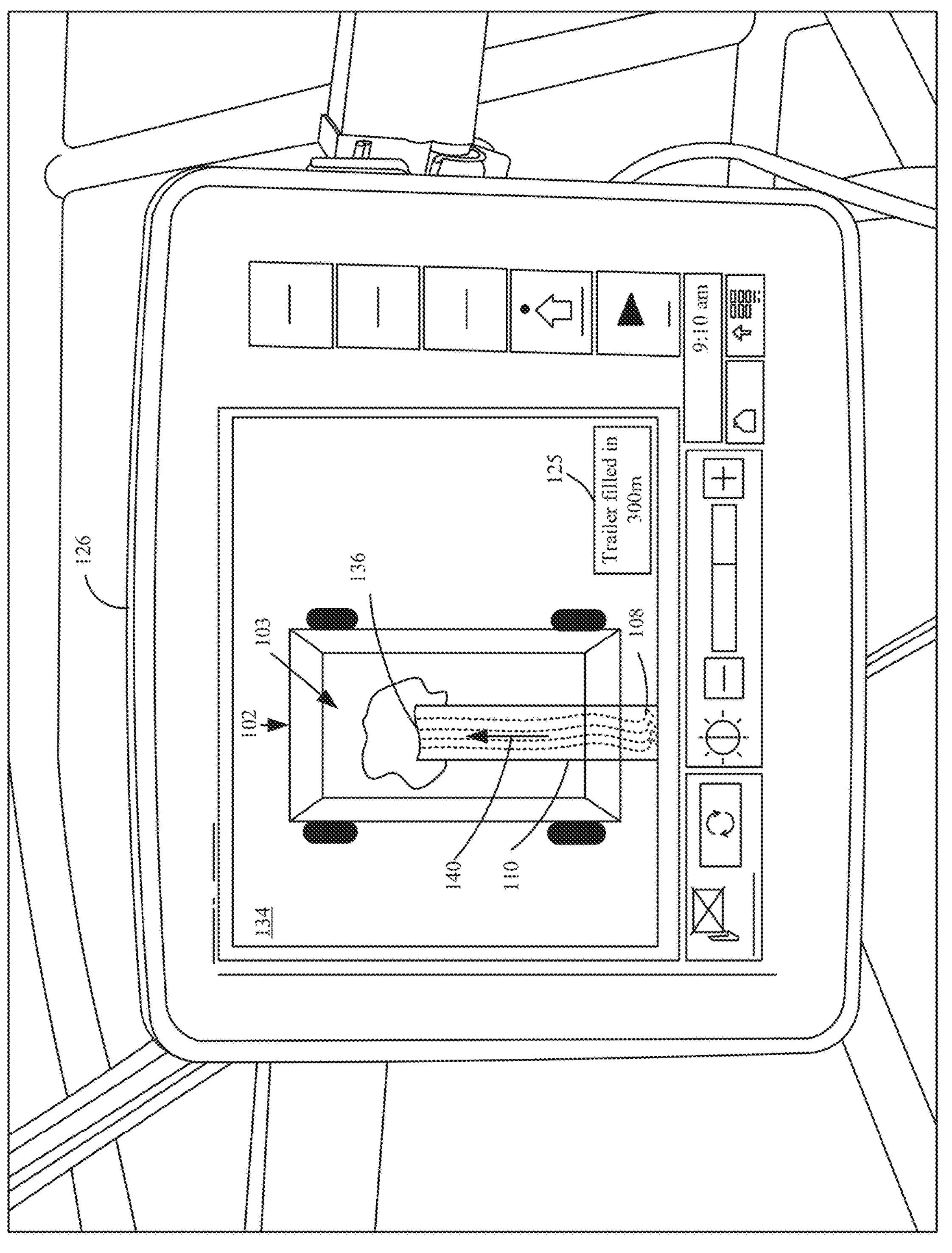
FIG. 4 is a pictorial illustration of an operator display showing video of a filling operation with the receiving vehicle in a position behind the forage harvester.

FIG. 4 is another example of an operator interface display 134 which can be generated for the operator of harvester 100. Some items are similar to those shown in FIG. 3 and they are similarly numbered. FIG. 4 shows a view from camera 106 of cart 102 that is following behind harvester 100. Material 110 is provided from spout 108 to cart 102. In the example shown in FIG. 4, the target landing point is represented by 136.

The automatic fill control system or separate system can then sense the fill level of cart 102 and generate a fill parameter indicative of when or where the cart 102 will reach its target capacity and display a fill parameter indicator 125. The fill parameter indicator 125 can be sent to a mobile app running on one or more mobile devices in one or more other receiving vehicles as well.

Figure 5:
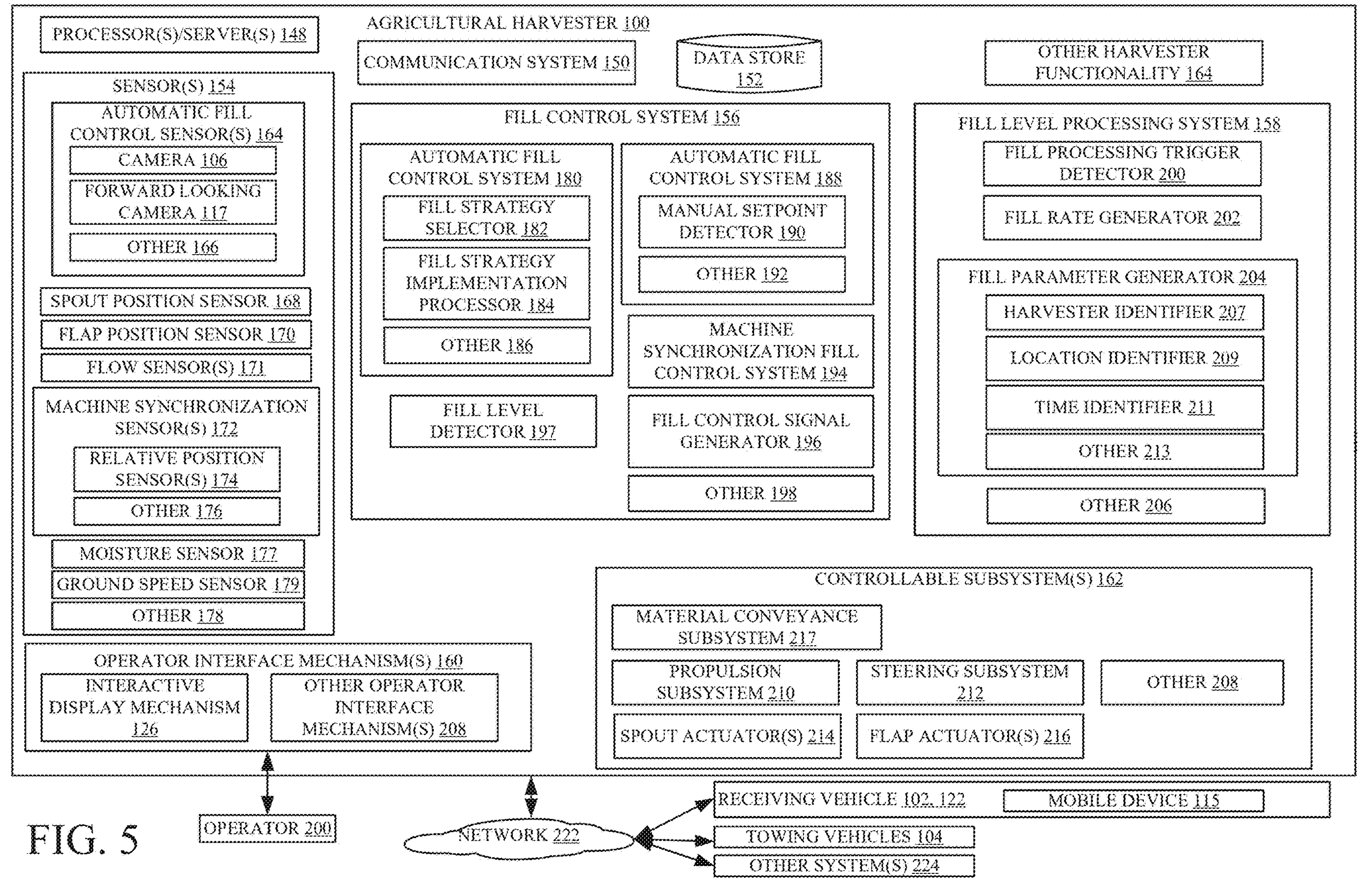
FIG. 5 is a block diagram of one example of an agricultural harvester.

FIG. 5 is a block diagram showing one example of a mobile work machine which comprises agricultural harvester 100, in more detail. Agricultural harvester 100, in the example shown in FIG. 5, includes one or more processors or servers 148, communication system 150, data store 152, sensors 154, fill control system 156, fill level processing system 158, operator interface mechanisms 160, controllable subsystems 162, and other harvester functionality 164. Sensors 154 can include automatic fill control sensors 164 that are used by fill control system 156. Sensors 164 can include camera 106 (which may be a mono-camera, stereo-camera or another type of camera), forward looking camera 117, and other fill control sensors 166. The other sensors can include such things as Doppler sensors, RADAR sensors, other image sensors or any of a wide variety of other types of sensors. Sensors 154 can also include spout position sensor 168, flap position sensor 170 and flow sensor 171. Spout position sensor 168 illustratively senses the position of spout 108 relative to the frame of harvester 100. Sensor 168 can do this by sensing the position of an actuator that drives movement of spout 108 relative to the frame of harvester 100, or sensor 168 can be a rotary position sensor, a linear sensor, a potentiometer, a Hall Effect sensor, or any other of a wide variety of sensors that can sense the position of spout 108 relative to the frame of harvester 100. Similarly, flap position sensor 170 can be a sensor that senses the position of the flap 109. Thus, sensor 170 can be a rotary position sensor, a linear sensor, a potentiometer, a Hall Effect sensor, a sensor that senses a position of an actuator that drives movement of flap 109, or any of a wide variety of other sensors. Flow sensor 171 can sense, for example, volumetric flow of material through harvester 100. Flow sensor 171 can be an optical sensor disposed at different locations in harvester 100, torque or pressure sensor(s) on mechanisms carrying the material through harvester 100, mechanical sensors sensing the material as it is engaged by harvester 100, or other sensors. Flow sensor 171 generates a signal indicative of the volumetric flow rate of material through harvester 100.

Sensors 154 can also include machine synchronization sensors 172. Sensors 172 can include relative position sensors 174 that sense the relative position of the harvester, relative to the receiving vehicle. Such sensors can include RADAR sensors, Doppler sensors, image or other optical sensors, or a wide variety of other relative position sensors. The relative position sensors 174 can also include position sensors (such as a GPS receiver, or another GNSS sensor, or another position sensor) that senses the position of harvester 100. This can be used, in conjunction with another position sensor on the receiving vehicle, to determine the position of the two vehicles relative to one another. The machine synchronization sensors 172 can include other sensors 176. The sensors 154 can include a crop moisture sensor 177, and a ground speed sensor 179, and a wide variety of other sensors 178 as well. Moisture sensor 177 can be a capacitive sensor or another sensor that generates an output indicative of a moisture level of the crop. Ground speed sensor 179 can sense the speed of travel of harvester 100 and generate an output indicative of the speed. Sensor 179 can sense the speed of rotation of an axle or a drive shaft or transmission on harvester 100. Sensor 179 can sense other characteristics indicative of the speed of harvester 100.

Fill control system 156 illustratively controls operations of various parts of harvester 100 (and possibly the towing vehicle 104) to fill the receiving vehicle 102, 122, as desired. Fill control system 156 can include automatic fill control system 180 (which, itself, can include fill strategy selector 182, fill strategy implementation processor 184, and other items 186), manual fill control system 188 (which, itself can include manual set point detector 190 and other items 192), and/or machine synchronization fill control system 194. Fill control system 156 can also include fill control signal generator 196, fill level detector 197, and other items 198. Fill level processing system 158 is shown as being separate from fill control system 156 but could be part of fill control system 156 as well, Fill level processing system 158 can include fill processing trigger detector 200, fill rate generator 202, fill parameter generator 204, other items 206. Fill parameter generator 204 can include harvester identifier 207, location identifier 209, time identifier 211, and other items 213.

Operator interface mechanisms 160 can include interactive display mechanism 126 and a variety of other operator interface mechanisms 208. Controllable subsystems 162 can include material conveyance subsystem 217, propulsion subsystem 210, steering subsystem 212, one or more spout actuators 214, one or more flap actuators 216 and other items 218. FIG. 5 also shows that operator 220 can interact through operator interface mechanism 160 to control and manipulate agricultural harvester 100. Further, FIG. 5 shows that harvester 100 is connected over network 222 to haulage units, such as receiving vehicle 102, 122, towing vehicle 104 and/or it can be connected to other systems 224. The operators of the haulage units (e.g., receiving vehicles 102, 122 or towing vehicles 104) may have access to a mobile device 115 that may be mounted in the operator compartment or carried by the operator. The mobile device(s) may run a mobile app. Before describing the overall operation of agricultural harvester 100 in more detail, a brief description of some of the items in agricultural harvester 100, and their operation, will first be provided.

Communication system 150 can facilitate communication among the items of harvester 100 and with other items over network 222. Network 222 can be a wide area network, a local area network, a near field communication network, a cellular communication network, or any of a variety of other networks or combinations of networks. Therefore, communication system can use a controller area network (CAN) bus or other controllers to facilitate communication of the items on harvester 100 with other items. Communication system 150 can also be different kinds of communication systems, depending on the particular network or networks 222 over which communication is to be made. In one example, communication system 150 can communicate with the mobile app on mobile device(s) 115 over network 222.

Operator interface mechanisms 160 can be a wide variety of different types of mechanisms. Interactive display mechanism 126 can be a display mechanism, such as that shown in FIGS. 3 and 4, or mechanism 126 can be a display mechanism on a mobile device, such as a tablet computer, a smartphone, etc., that is carried by the operator 200 and/or mounted in the operator compartment of harvester 100. Thus, interactive display mechanism 126 can be a touch sensitive display mechanism, a display mechanism that receives inputs through a point and click device, or other kinds of display mechanisms.

Other operator interface mechanisms 208 can include a steering wheel, levers, buttons, pedals, a microphone and speaker (where speech recognition and speech synthesis are provided), joysticks, or other mechanical, audio, visual, or haptic mechanisms that can be used to provide outputs to operator 220 or to receive inputs from operator 220.

Controllable subsystems 162 can be controlled by various different items on harvester 100. Material conveyance subsystem 217 can include any mechanisms used to convey material 110 through harvester 100 and to a haulage unit, such as conveyors, augers, fans, etc.

Propulsion subsystem 210 can be an engine that drives ground-engaging elements (such as wheels or tracks) through a transmission, hydraulic motors that are used to drive ground-engaging elements, electric motors, direct drive motors, or other propulsion systems that are used to drive ground-engaging elements to propel harvester 100 in the forward and rearward directions. Propulsion subsystem 210 can illustratively be controlled with a throttle to increase or decrease the speed of travel of harvester 100.

Steering subsystem 212 can be used to control the heading of harvester 100. One or more spout actuators 214 are illustratively configured to drive rotation or other movement of spout 108 relative to the frame 107 of harvester 100. Actuators 214 can be hydraulic actuators, electric actuators, pneumatic actuators, or any of a wide variety of other actuators. Similarly, one or more flap actuators 216 are used to drive the position of flap 109 relative to spout 108. The flap actuators 216 can also be hydraulic actuators, electric actuators, pneumatic actuators, or any of a wide variety of other actuators.

Fill control system 156 can use automatic fill control system 180 to perform automated fill control to automatically execute a fill strategy in filling one of the haulage units (e.g., one of receiving vehicles 102, 122). Therefore, fill strategy selector 182 can detect a user input selecting a fill strategy, or another input selecting a fill strategy and access data store 152 for a stored fill algorithm that can be executed to perform the selected fill strategy. For instance, where the selected fill strategy is a back-to-front strategy, the algorithm will direct filling of the receiving vehicle beginning with a target landing point at the back of the receiving vehicle and moving to a target landing point toward the front of the receiving vehicle. Other fill strategies can be selected as well. Fill level detector 197 receives an input from camera 106 and generates an output indicative of the height of material at the current landing point in the receiving vehicle and the overall fill level for the receiving vehicle (e.g., how close the receiving vehicle is to a target capacity. The target capacity may be an operator input value, a default value, an automatically generated value, or another value. Fill strategy implementation processor 184 receives inputs from the automatic fill control sensors 164, spout position sensor 168, and flap position sensor 170, and can also access kinematic information for spout 108, and receives an output from fill level detector 197, and generates an output to fill control signal generator 196 based upon the inputs, to execute the desired automatic fill control strategy. Fill control signal generator 196 can generate control signals to control any of the controllable subsystems 262 (or other items) to execute the fill strategy being implemented by fill strategy implementation processor 184.

Manual fill control system 188 can use manual set point detector 190 to detect a manual input from operator 220 (e.g., through interactive display mechanism 126) to identify a target landing point in the haulage unit (e.g., receiving vehicle 102, 122) where the operator 200 desires the filling operation to be performed. Manual fill control system 188 can then generate outputs to fill control signal generator 196 which generates control signals to control the controllable subsystems 162 so that filling commences at the manually identified target landing point in the receiving vehicle 102, 122.

Machine synchronization fill control system 194 can receive operator inputs or other inputs, as well as sensor inputs from sensors 154 to generate outputs to fill control signal generator 196 in order to synchronize the positions of agricultural harvester 100 and the haulage unit (e.g., receiving vehicle 102, 122) so that a desired filling operation is performed. For instance, machine synchronization control system 194 can receive sensor inputs identifying that the current position that is being filled in receiving vehicle 102, 122, is at a desired fill level so that the 11 receiving vehicle should move forward or rearward relative to agricultural harvester 100. Machine synchronization fill control system 194 then generates an output to fill control signal generator 196 indicating this. Fill control signal generator 196 can generate an output either to controllable subsystems 162, or communication system 150, or both, based on the inputs from machine synchronization fill control system 194. For instance, where the output from system 194 indicates that the receiving vehicle 102, 122 should move forward relative to agricultural harvester 100, then fill control signal generator 196 can control communication system 150 to communicate with a corresponding machine synchronization fill control system 194 on towing vehicle 104 indicating that towing vehicle 104 should "nudge" forward relative to the harvester 100 by momentarily increasing its ground speed and then returning to its current ground speed. Alternatively, or in addition, fill control signal generator 196 can generate control signals to control the propulsion subsystem 210 on agricultural harvester 100 to momentarily change the speed of agricultural harvester 100 so that the position of the receiving vehicle 102, 122 relative to agricultural harvester changes as desired.

Fill level processing system 158 receives the fill level of the receiving vehicle from fill level detector 197. In one example, fill level processing system 158 receives the overall fill level (e.g., how close the receiving vehicle is to its target capacity). Fill processing trigger detector 200 detects when a new fill parameter is to be generated. Again, the fill parameter is illustratively a parameter indicative of when the receiving vehicle or haulage unit currently being filled by agricultural harvester 100 will be filled to its target capacity. Trigger detector 200 can trigger the generation of a new fill parameter on a periodic or otherwise intermittent basis. Similarly, trigger detector 200 can trigger the generation of a new fill parameter based on how close the receiving vehicle is to its target capacity, and/or based on how quickly the receiving vehicle is being filled. For instance, if the receiving vehicle is being filled at a first rate and is only half full, then trigger detector 200 may trigger the generation of a new value for the fill parameter at one rate. However, if the receiving vehicle is ninety percent full and is filling at a second rate that is quicker than the first rate, then trigger detector 200 may trigger the evaluation or generation of a fill parameter more often.

Fill rate generator 202 then receives information from sensors and other items on agricultural harvester 100 and generates an output indicative of the fill rate, (e.g., how quickly the receiving vehicle is being filled). For instance, fill rate generator 202 may monitor the rate at which the receiving vehicle is filled by monitoring the change in the overall fill level detected by fill level detector 197 over time. This historical fill rate for this receiving vehicle may be used to estimate the future fill rate as well. In another example, fill rate generator 202 may receive an input from forward looking camera 117 and perform image processing on that image to identify an estimate of a volume of material that the harvester 100 is about to encounter in the field. This volume can be used to estimate the volumetric flow rate of material through harvester 100, and thus to estimate the rate at which the receiving vehicle is being filled.

In another example, flow sensor 171 may sense volumetric flow rate of material, as it is moving through agricultural harvester 100. Sensor 171 may generate a flow rate signal indicative of the sensed volumetric flow rate and provide that to fill rate generator 202. Based upon the size of the receiving vehicle and the volumetric flow rate sensed by flow sensor 171, fill rate generator 202 can generate an output indicative of how quickly the receiving vehicle is being filled.

Fill parameter generator 204 then generates a fill parameter indicative of when the receiving vehicle will be filled to its target capacity. Fill parameter generator 204 may have access to the dimensions of the receiving vehicle that may be stored in datastore 152, or those dimensions, when used by fill parameter generator 204, can be sensed or otherwise obtained by fill parameter generator 204. In one example, there may be multiple harvesters in a single field and therefore harvester identifier 207 generates a harvester identifier output that uniquely identifies agricultural harvester 100 among the various harvesters that are working in the field. Location identifier 209 can generate an output indicating a geographic location where harvester 100 will be when its current receiving vehicle is filled to its capacity. For instance, location identifier 209 may receive an input from ground speed sensor 179 indicating that ground speed of agricultural harvester 100, and a fill rate signal output by fill rate generator 202 indicating the rate at which the receiving vehicle is being filled to its target capacity. Location identifier 209 may then access a route that agricultural harvester 100 is following or a geographic position of harvester 100 and a heading of harvester 100. Given the direction that agricultural harvester 100 is traveling, and its ground speed, and given a rate at which the receiving vehicle is being filled and its current overall fill level, location identifier 209 can generate an output indicative of a geographic location (in a local or global coordinate system) where agricultural harvester 100 will be located when the receiving vehicle that it is currently filling reaches target capacity.

Time identifier 211 generates an output indicative of a time (either an absolute time in the future or a time period that will elapse) before agricultural harvester 100 fills its current receiving vehicle to target capacity. For instance, given the current fill level of the receiving vehicle detected by fill level detector 197 and the current fill rate generated by fill rate generator 202, time identifier 211 can compute the time it will take to fill the receiving vehicle to its target capacity.

Fill parameter generator 204 outputs the fill parameter to fill control signal generator 196. Fill control signal generator 196 can control communication system 150 to communicate the fill parameter to a mobile app on mobile device 115 on the receiving vehicles including one or more receiving vehicles that are not currently being filled by the harvester 100. Fill level processing system 158 can output the fill parameter to operator interface mechanisms 160 for display to operator 200. Control signals can be generated in other ways, based upon the fill parameter as well.

Figure 6:
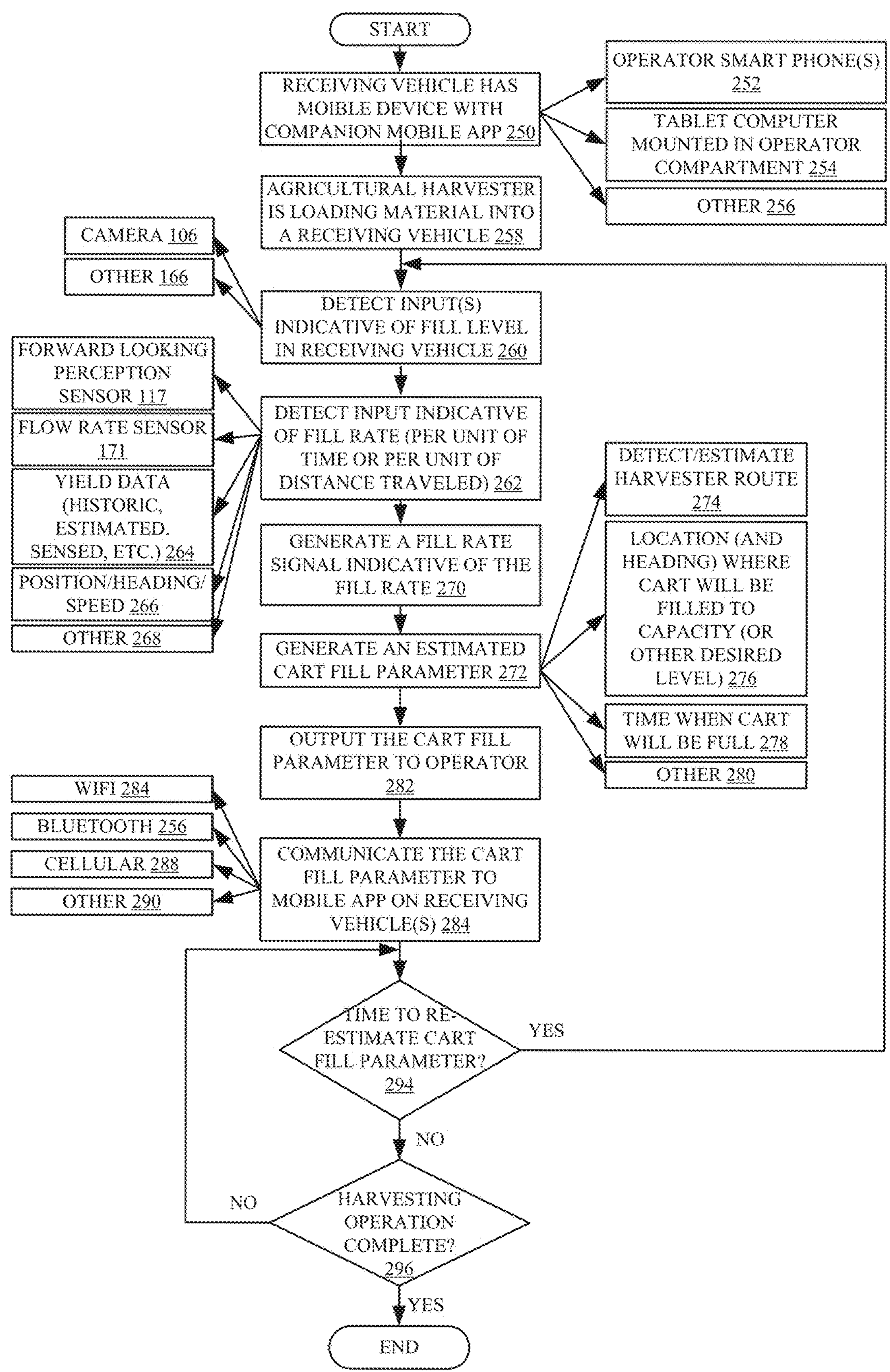
FIG. 6 shows a flow diagram illustrating one example of detecting a fill parameter and communicating the fill parameter to a mobile application.

FIG. 6 is a flow diagram illustrating one example of the operation of agricultural harvester 100 in generating the fill parameter and communicating it to the mobile app on mobile devices 115 on other receiving vehicles. It is first assumed that the receiving vehicle has a mobile device 115 with a companion mobile app that may be a companion to an application or algorithm that is run by fill level processing system 158. This is indicated by block 250 in the flow diagram of FIG. 6. Mobile device 115 may be a smart phone carried by the operator of a receiving vehicle or haulage unit, as indicated by block 252, or a tablet computer mounted in the operator compartment of a receiving vehicle or haulage unit as indicated by block 254, or another mobile device 256. Agricultural harvester 100 is loading material into a receiving vehicle (in the present example it is assumed that the receiving vehicle is a cart 102 towed by a tractor 104) as indicated by block 258. Fill level detector 197 then detects one or more inputs indicative of a fill level in the receiving vehicle, as indicated by block 260. In one example, the input can be received from camera 106, or other fill control sensors 166.

Fill rate generator 202 then detects an input indicative of a fill rate of the receiving vehicle, as indicated by block 262. The fill rate may be a portion of the receiving vehicle that is filled per unit of time, a portion of the receiving vehicle that is filled per unit of distance traveled by harvester 100, or in other terms. The fill rate generator 202 can receive an input from a forward looking perception sensor, such as forward looking camera 117, and/or from a flow rate sensor 171. The fill rate generator 202 can receive yield data (e.g., historic yield data, estimated yield data, or sensed real time yield data) 264 as an input and generate an output indicative of the fill rate based upon the yield that the agricultural harvester 100 is about to encounter in the field. The fill rate generator 202 may also receive an input indicating the position, heading, and speed of harvester 100, as indicated by block 266. Fill rate generator 202 may receive a wide variety of other inputs 268 as well. Fill rate generator 202 then generates an output signal indicative of the rate at which the receiving vehicle is being filled, as indicated by block 270.

Fill parameter generator 204 then generates an estimated cart fill parameter that is indicative of when or where the cart 102 will be filled. Generating the estimated cart fill parameter is indicated by block 272 in the flow diagram of FIG. 6. Fill rate parameter generator 204 may detect or estimate the route of the harvester 100, and the speed of harvester 100, as indicated by block 274. Location identifier identifies the location where harvester 100 will be when the cart that harvester 100 is currently filling will likely reach its target capacity, as indicated by block 276. Again, the location may be a set of geographic coordinates in a local or global coordinate system, a route, etc.

Time identifier 211 may generate an output indicative of how long it will be until cart 102 reaches its target capacity, or an absolute time in the future when cart 102 is likely to reach its target capacity. Generating a time when the cart will reach its target capacity is indicated by block 278. The cart fill parameter can be any of a wide variety of other or additional parameters as well.

Fill level processing system 158 then outputs the cart fill parameter to the operator 200 of agricultural harvester 100 and controls communication system 150 to communicate the fill parameter to the mobile app on the mobile device 115 of the receiving vehicles that may be serving agricultural harvester 100. Outputting the cart fill parameter to operator 200 is indicated by block and communicating the cart fill parameter to the mobile app on mobile devices 115 on other receiving vehicles is indicated by block 284 in the flow diagram of FIG. 6. The communication channel can be a Wi-Fi channel 284, a Bluetooth channel 286, a cellular channel 288, or another type of communication channel 290.

Fill processing trigger detector 200 then detects whether it is time to re-estimate or re-generate the cart fill parameter, as indicated by block 294. If so, processing reverts to block 260. If not, then the processing continues until the harvesting operation is complete, as indicated by block 296.

Figure 7:
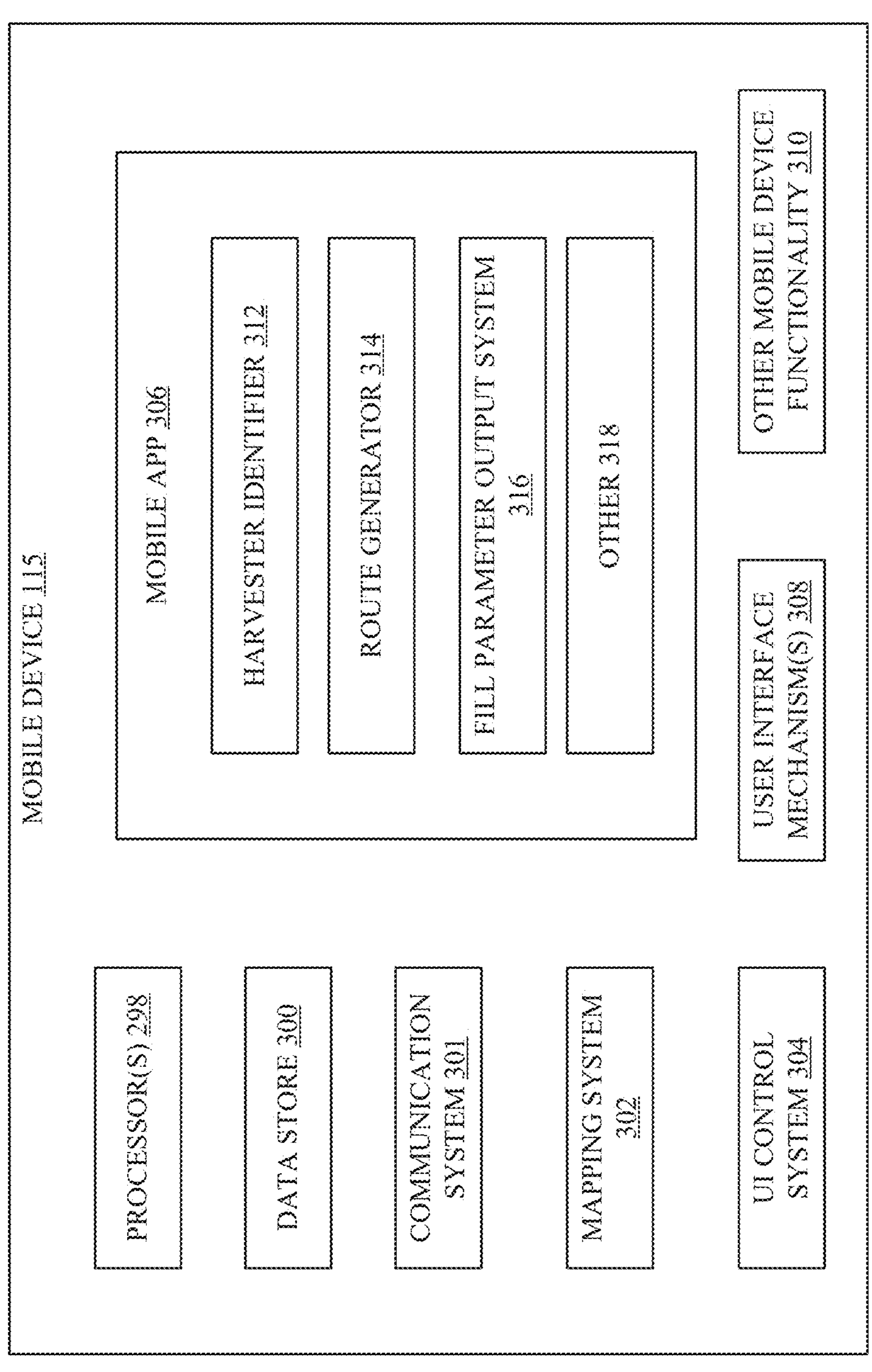
FIG. 7 shows a block diagram of a portion of a mobile device on a receiving vehicle.

FIG. 7 is a block diagram of one example of a mobile device 115 that can be used in the receiving vehicles. Mobile device 115 can include a processor 298, a data store 300, communication system 301, a mapping system 302, a user interface (UI) control system 304, a mobile app 306, user interface mechanisms 308, and a wide variety of other mobile device functionality 310. Mobile app 306 can include a harvester identifier 312, a route generator 314, fill parameter output system 316 and a wide variety of other items 318.

Communication system 301 can include one or more different types of communication systems, such as a Wi-Fi communication system, a cellular communication system, a near field communication system, a Bluetooth communication system, a local area network or wide area network communication system, a web-based communication system, or any of a wide variety of other communication systems. Mapping system 302 can include a GNSS receiver or another position sensor that detects a current location of mobile device 115 and generates a map with map functionality, such as route planning, direction finding, etc. UI control system 304 controls user interface mechanisms 308 which may include a touch sensitive screen, buttons, keypads, microphone and speaker, and any of wide variety other user interface mechanisms.

Mobile app 306 can receive the fill parameter generated by fill parameter generator 204 on agricultural harvester 100 through communication system 301. Harvester identifier 312 identifies, from the fill parameter, the particular harvester that generated the fill parameter. Fill parameter output system 316 can generate an output of an indication of the fill parameter to the operator through user interface mechanisms 308. Route generator 314 may use mapping system 302 to generate a route to the position where the harvester 100 will be when the receiving vehicle that harvester 100 is currently loading reaches its target capacity. The fill parameter output system may invoke mapping system 302 to output that route for the operator of the receiving vehicle on which mobile device 115 resides. Fill parameter output system 316 may generate an output simply indicating when the harvester 100 will fill its current receiving vehicle to the target capacity, where the harvester 100 will be when its current receiving vehicle is filled to the target capacity, how long it will be until the receiving vehicle is filled to the target capacity, or other things. Some examples are discussed in greater details below.

Figure 8:
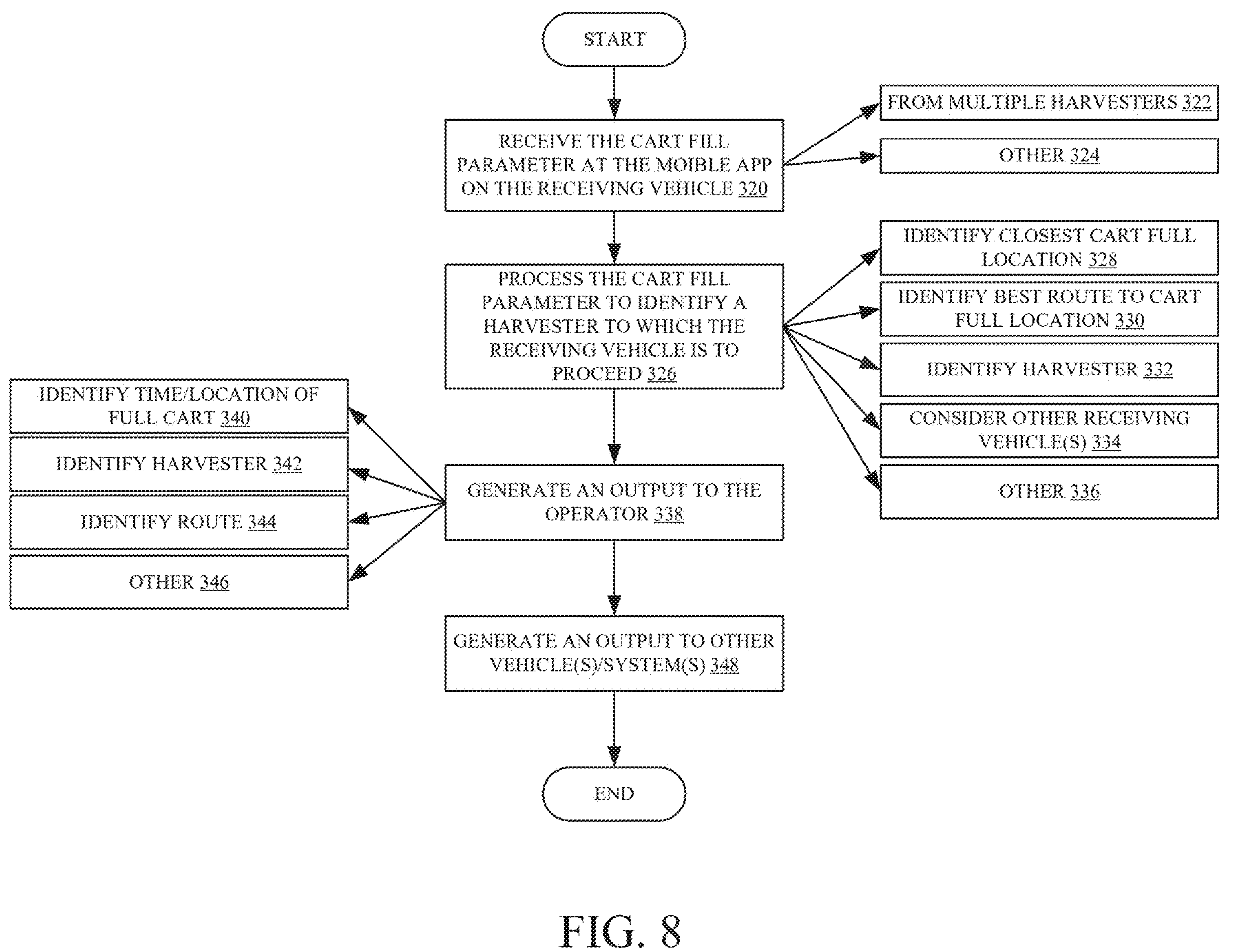
FIG. 8 is a flow diagram showing one example of the operation of a mobile device.

FIG. 8 is a flow diagram illustrating one example of the operation of mobile app 306 in an example in which the mobile device 115 running mobile app 306 is disposed in an empty receiving vehicle that is returning to be loaded by a harvester. Mobile app 306 first receives the cart fill parameter from the agricultural harvester 100 that generated it. This is indicated by block in the flow diagram of FIG. 8. It should be noted that mobile app 306 may receive multiple different fill parameters from multiple different harvesters 322, such as when multiple different harvesters are harvesting in the same field. The cart fill parameter can be received by the mobile app 306 in a wide variety of different or other ways as indicated by block 324.

Mobile app 306 then processes the cart fill parameter to identify a particular harvester 100 to which the empty receiving vehicle should proceed, as indicated by block 326. In one example, mobile app 306 identifies the location closest to the empty receiving vehicle where a receiving vehicle being loaded by one of the harvesters will be filled to its target capacity, as indicated by block 328. In another example, route generator 314 can generate a best route from the empty receiving vehicle to a location where the cart being filled by a harvester will reach its target capacity, as indicated by block 330.

The fill parameter output system 316 may identify the particular harvester where the operator of the empty receiving vehicle is to drive to, as indicated by block 332.

Route generator 314 may consider the location of the other receiving vehicles in the field. For instance, the mobile app 306 on each receiving vehicle may communicate the current position of the corresponding receiving vehicle on which it resides to other receiving vehicles in the area so that mobile apps on those other receiving vehicles can determine whether a different receiving vehicle is closer or further away from a specific harvester in the field. Considering the locations of other receiving vehicles is indicated by block 334 in the flow diagram of FIG. 8. The cart fill parameter can be processed in other ways to identify where the operator of the receiving vehicles should drive as well, as indicated by block 336.

Mobile app 306 then provides the information to user interface control system 304 which generates an output on user interface mechanisms 308 to the operator of the receiving vehicle (e.g., to the operator of a towing vehicle), as indicated by block 338. The output may identify the time and/or location where the cart currently being filled by a particular harvester may reach its target capacity, as indicated by block 340. The output may identify a harvester that the operator of the empty receiving vehicle is to drive to, as indicated by block 342. The output may identify a specific or best route 344, or the output may identify a wide variety of other information 346 as well.

Mobile app 306 may use communication system 301 to generate an output to other vehicles or systems as well, as indicated by block 348. For instance, mobile app 306 may generate an output indicating that mobile app 306 is instructing the operator of the empty receiving vehicle to proceed to a particular harvester so that other mobile apps on other receiving vehicles can consider that in identifying how the operator of those other receiving vehicles should proceed.

Figure 9A:
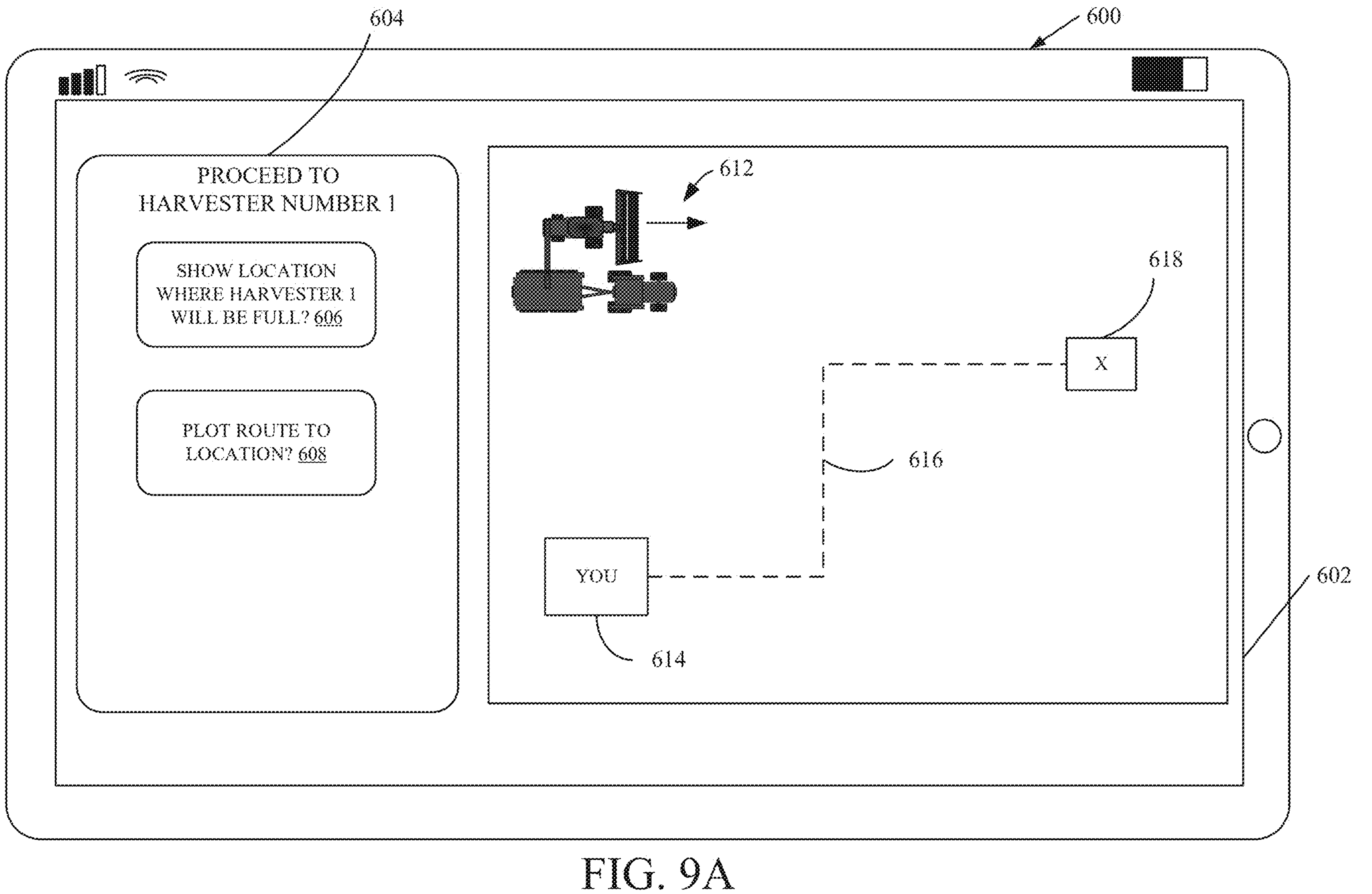
FIGS. 9A and 9B show examples of displays generated by a mobile device.

FIG. 9A shows one example of a mobile device, in the form of a tablet computer 600. Tablet computer 600 includes a screen 602 which can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism such as a wireless link or USB port, for instance. Computer 600 can also illustratively receive voice inputs as well.

In the example shown in FIG. 9A, computer 600 generates a display that displays a message 604 instructing the operator to proceed to a particular harvester ("Harvester 1") and provides two actuators 606 and 608 that the operator can actuate. In one example, actuator 606 can be actuated so that the mobile app shows the location where Harvester 1 will be when its corresponding receiving vehicle is filled to its target capacity. Actuator 608 can be actuated to have route generator 314 generate a best route to the location of harvester 100 when the harvester's receiving vehicle is at its target capacity. In the example shown in FIG. 9A, the operator has actuated actuator 608 so that mobile app 306 uses mapping system 302 to generate a map display 610. Map display 610 shows a current location 612 of Harvester 1 and a current location 614 of the receiving vehicle on which computer 600 resides. Map display 610 also displays a route 616 that can be taken by the empty receiving vehicle to reach a location 618 where the receiving vehicle currently being filled by harvester 100 will be at its target capacity.

Figure 9B:
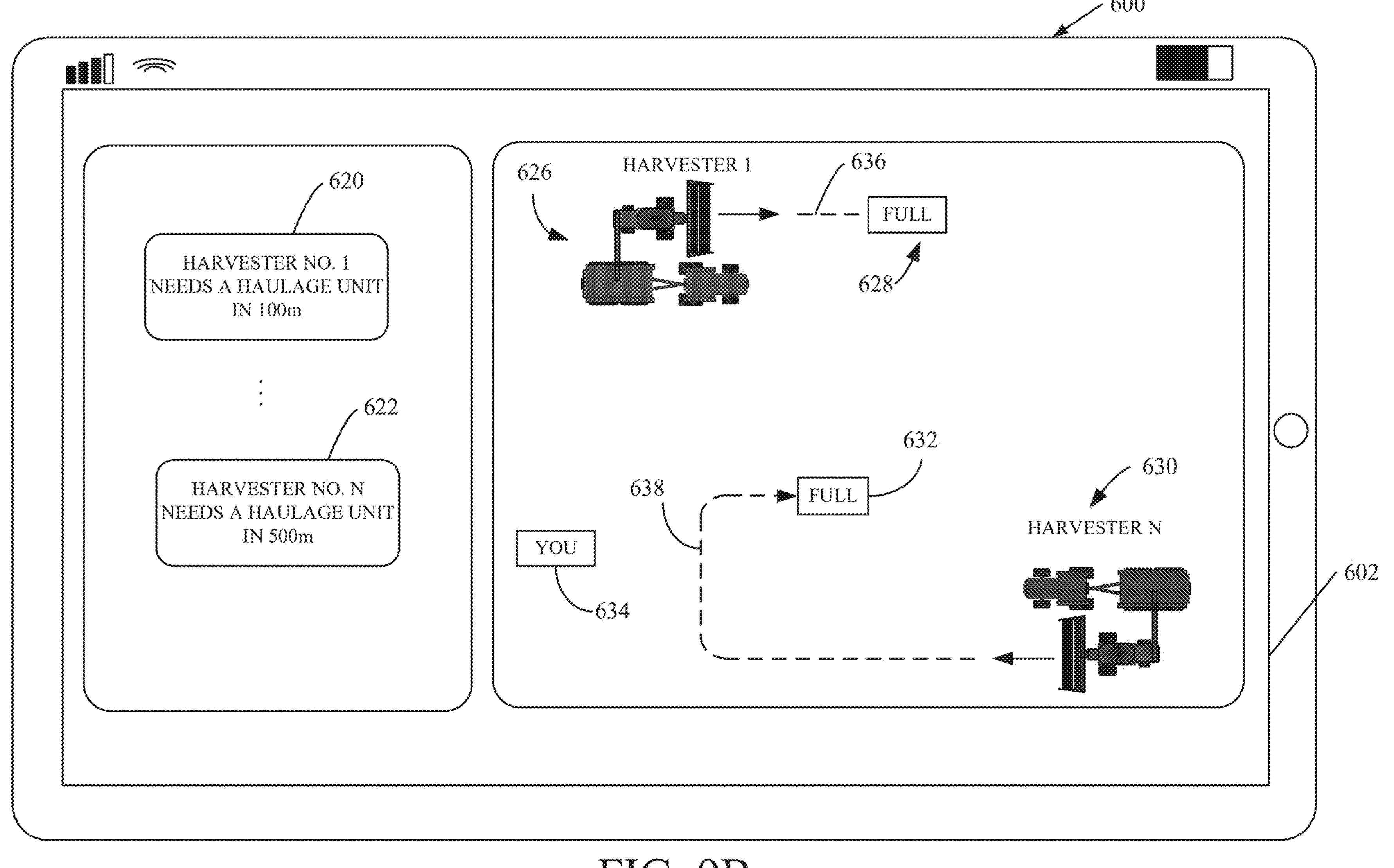

FIG. 9B shows another example of a user interface display that can be generated by mobile app 306 on computer 600. In the example shown in FIG. 9B, mobile app 306 generates a user interface display that has a first indicator 620 that indicates how much further a first harvester (Harvester 1) needs to travel before its current receiving vehicle has reached its target capacity. Indicator 622 is a similar indicator, but showing how far another harvester (Harvester N) will travel before the receiving vehicle that it is currently filling with material will reach its target capacity. Mobile app 306 can also use mapping system 302 to generate a map display 624 that shows the current locations 626 of Harvester 1 and the location 628 where the receiving vehicle currently being filled by Harvester 1 will reach target capacity. Map display 624 also shows a current location 630 of Harvester N and a location 632 where Harvester N will be when its current receiving vehicle reaches target capacity. In the example shown in FIG. 9B, the map display 624 also shows a current location 634 of the receiving vehicle on which computer 600 resides. In addition, map display 624 can show a first route 636 that Harvester 1 will follow to reach the location 628 where its receiving vehicle will reach target capacity. Map display 624 can also show a second route 638 that Harvester N will follow to reach the location 632 where its current receiving vehicle will reach target capacity. The operator of the receiving vehicle on which computer 600 resides can use map display 624 and the information provided by indicators 620 and 622 to decide where to proceed in order to assist one of the harvesters illustrated on map display 624.

The user interface displays shown in FIGS. 9A and 9B are only examples and a wide variety of other user interface displays can be generated as well.

It can thus be seen that the present description describes a system in which a material loading vehicle generates a fill parameter indicative of at least one of when or where that material loading vehicle will be when the receiving vehicle that it is currently filling reaches a target capacity. That information can be output to a mobile app (which may be a companion app or a stand alone mobile app) on mobile devices carried by other receiving vehicles so that operators of those receiving vehicles can best plan their routes.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. The interface displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 10:
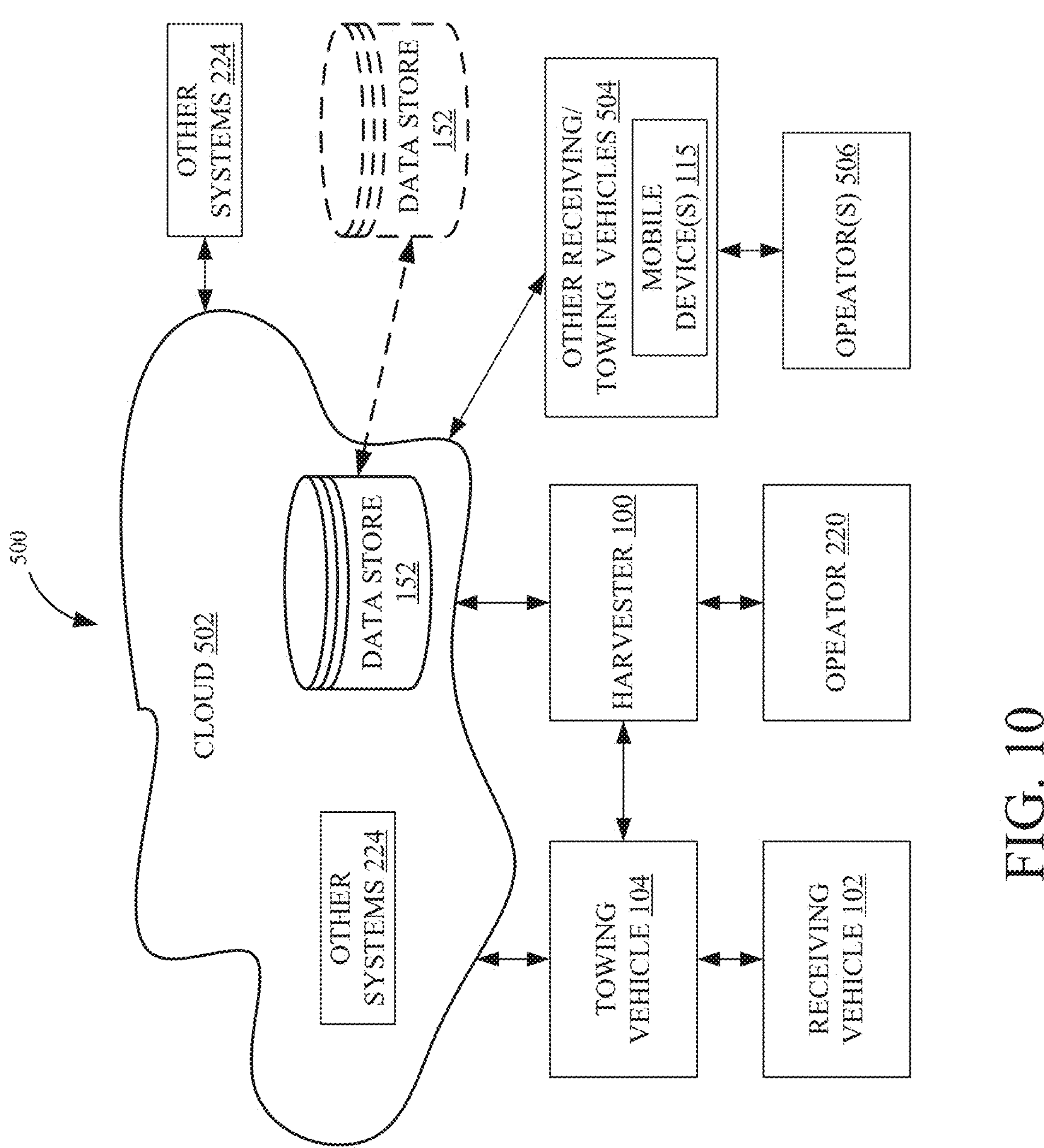
FIG. 10 shows one example of a block diagram of a remote server architecture.

FIG. 10 is a block diagram of harvester 100, shown in previous FIGS., except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though the servers appear as a single point of access for the user. Thus, the components and functions described herein can be provided from a remote server at a remote location using a remote server architecture. Alternatively, the components and functions can be provided from a conventional server, or they can be installed on client devices directly, or in other ways.

In the example shown in FIG. 10, some items are similar to those shown in previous FIGS. and they are similarly numbered. FIG. 10 specifically shows that data store 152, other systems 224, and other parts of the harvester 100 shown in previous FIGS. can be located at a remote server location 502. Also, other receiving vehicle(s) 504, with mobile device(s) 115 and operator(s) 506 can be disposed on architecture 500 as well. Therefore, harvester 100 accesses those systems through remote server location 502.

FIG. 10 also depicts another example of a remote server architecture. FIG. 10 shows that it is also contemplated that some elements of previous FIGS. are disposed at remote server location 502 while others are not. By way of example, data store 152 or other systems 224 can be disposed at a location separate from location 502, and accessed through the remote server at location 502. Regardless of where the items are located, the items can be accessed directly by harvester 100, through a network (such as a wide area network or a local area network), the items can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester 100 comes close to the fuel truck for fueling, the system automatically collects the information from the harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester 100 until the harvester 100 enters a covered location. The harvester 100, itself, can then send the information to the main network.

It will also be noted that the elements of previous FIGS. or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 11:
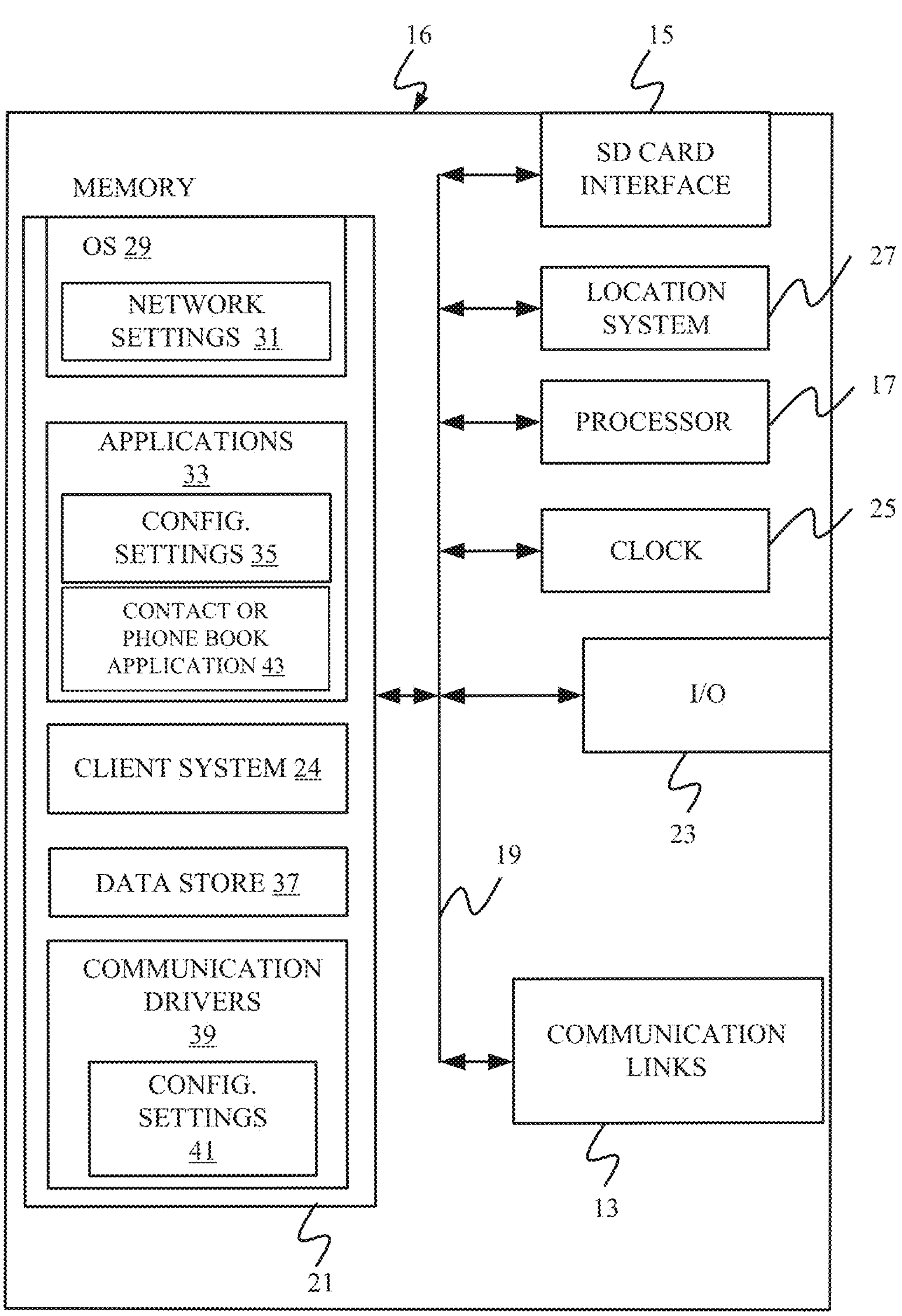
FIGS. 11-12 show examples of mobile devices that can be used in receiving vehicles and harvesters.
Figure 12:
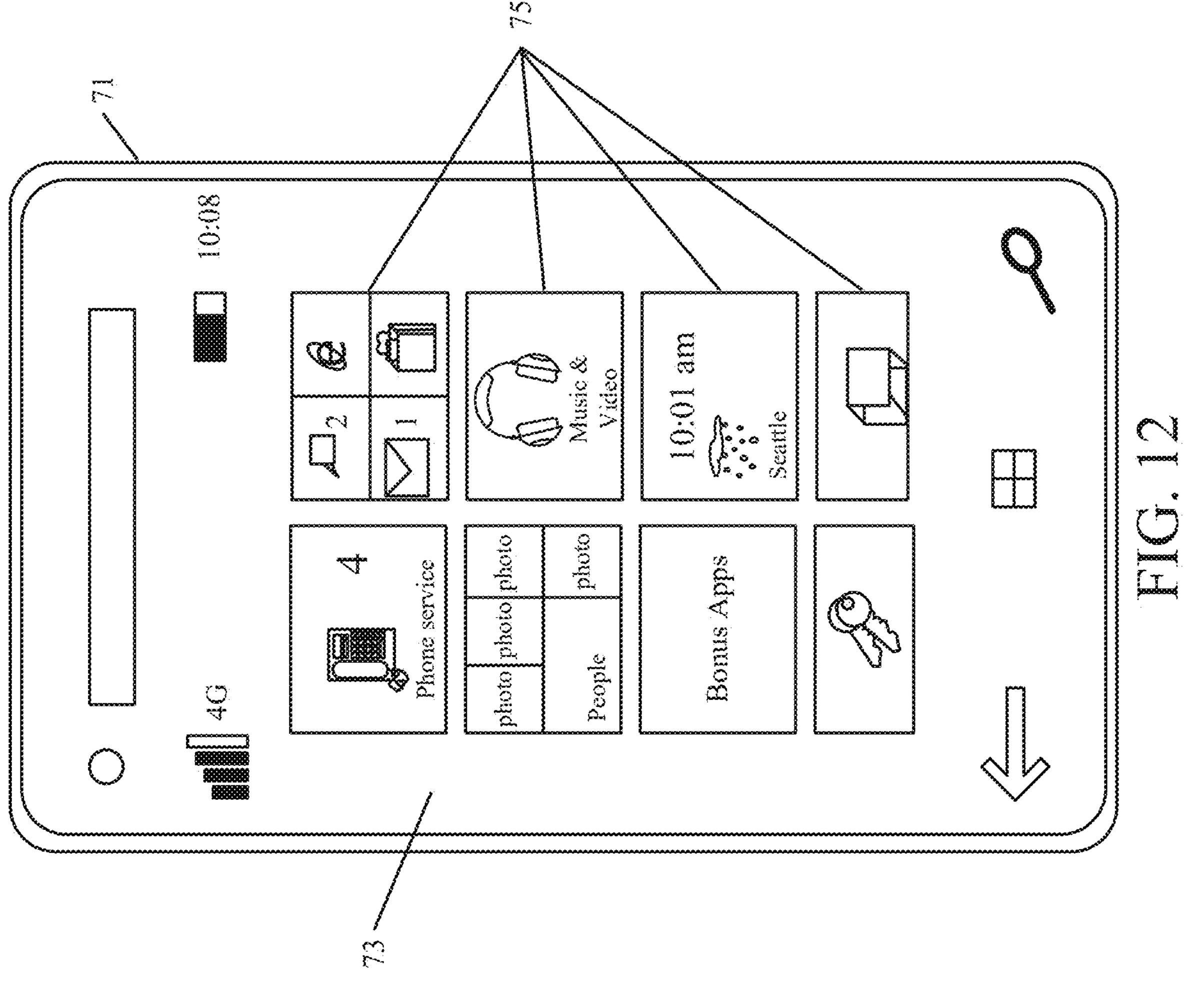

FIG. 11 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the spout and flap and turn data. FIGS. 9A, 9B, and 12 are examples of handheld or mobile devices.

FIG. 11 provides a general block diagram of the components of a client device 16 that can run some components shown in previous FIGS., that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors/servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
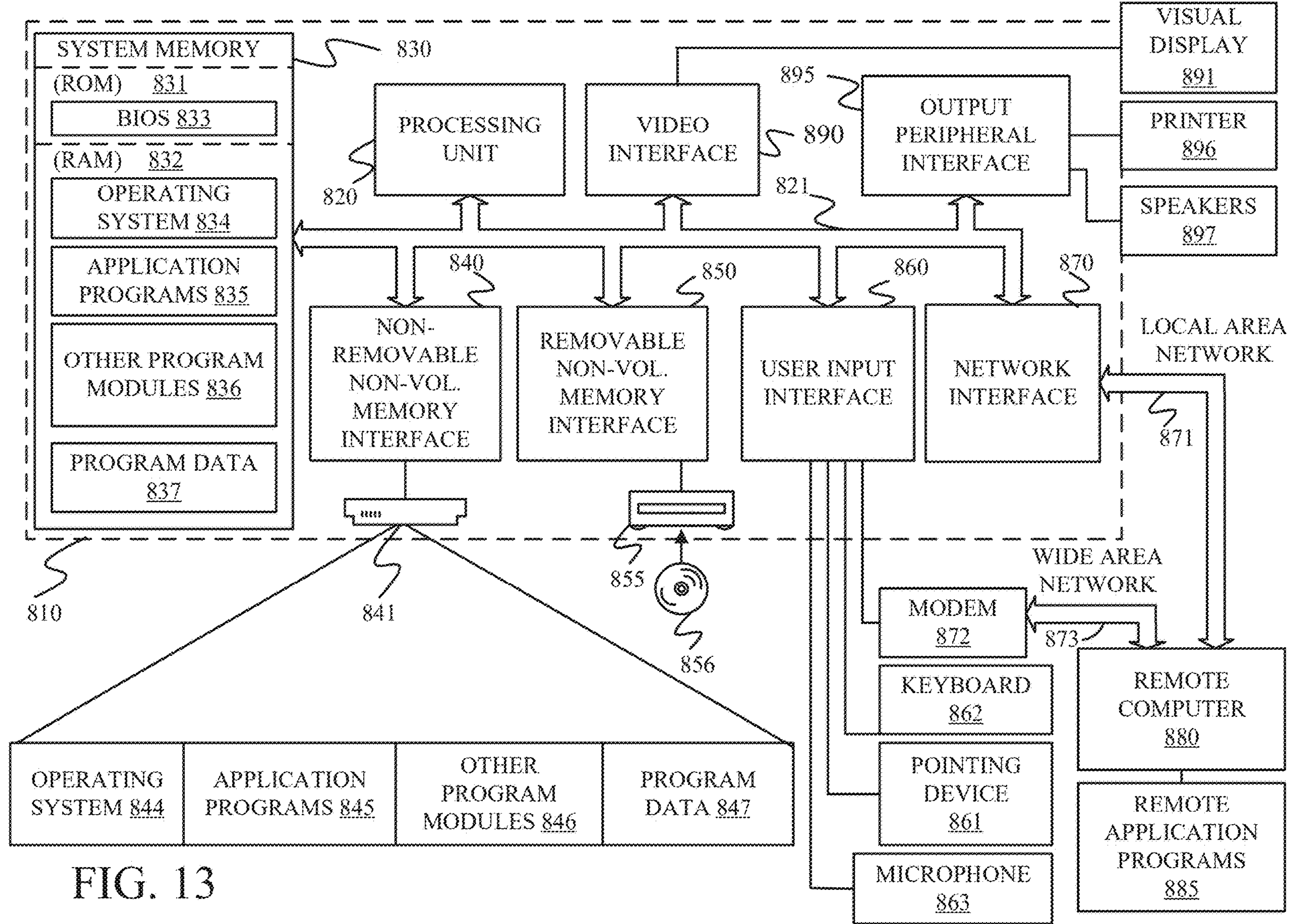
FIG. 13 is a block diagram of a computing environment that can be used in the machines, systems, and architectures shown and discussed with respect to the previous figures.

FIG. 13 is one example of a computing environment in which elements of previous FIGS., or parts of it, (for example) can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processor or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term “modulated data signal” means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network-CAN, local area network—LAN, or wide area network—WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a material loading vehicle, comprising:

- a material conveyance subsystem that conveys material from the material loading vehicle to a first receiving vehicle through a spout;
- a fill sensor that generates a fill level sensor signal indicative of a fill level of material in the first receiving vehicle;
- a fill level detector that identifies an overall fill level in the first receiving vehicle based on the fill level sensor signal and generates an overall fill level sensor signal indicative of the overall fill level;
- a fill parameter generator that generates a fill parameter indicative of when the first receiving vehicle will reach a given fill level based on the overall fill level sensor signal; and
- a communication system that communicates the fill parameter to a mobile application running on a mobile device in a second receiving vehicle.

Example 2 is the material loading vehicle of any or all previous examples and further comprising:

- a fill rate generator configured to receive a flow rate indicator indicative of a volumetric flow rate of material through the material loading vehicle and generates, based on the flow rate indicator, a fill rate indicator indicative of a rate at which the first receiving vehicle is being filled with the material from the loading vehicle.

Example 3 is the material loading vehicle of any or all previous examples wherein the fill parameter generator comprises:

- a location identifier configured to generate, as the fill parameter, a fill location indicative of a location where the receiving vehicle will reach the given fill level.

Example 4 is the material loading vehicle of any or all previous examples wherein the fill parameter generator comprises:

- a time identifier configured to generate, as the fill parameter, a value indicative of a time when the receiving vehicle will reach the given fill level.

Example 5 is the material loading vehicle of any or all previous examples wherein the material loading vehicle comprises one of a plurality of material loading vehicles operating at a worksite and wherein the fill parameter generator comprises:

- a loading vehicle identifier configured to generate, as a portion of the fill parameter, a loading vehicle indicator that uniquely identifies the material loading vehicle among the plurality of material loading vehicles operating at the worksite.

Example 6 is the material loading vehicle of any or all previous examples and further comprising:

a flow sensor configured to sense a flow of material through the material loading vehicle and generate, as the flow rate indicator, a flow sensor signal indicative of the sensed flow of material through the material loading vehicle.

Example 7 is the material loading vehicle of any or all previous examples and further comprising:

a forward looking camera configured to capture an image of a worksite and generate a camera signal indicative of the captured image.

Example 8 is the material loading vehicle of any or all previous examples wherein the fill rate generator is configured generate an estimated volumetric flow rate of material through the material loading vehicle based on the camera signal and to generate the fill rate indicator based on the estimated volumetric flow rate of material through the material loading vehicle.

Example 9 is the material loading vehicle of any or all previous examples wherein the fill rate generator is configured to aggregate historic fill rate values to obtain, as the flow rate indicator, an aggregated fill rate value and to generate the fill rate generator based on the aggregated fill rate value.

Example 10 is the material loading vehicle of any or all previous examples wherein the material loading vehicle comprises a harvester operating in a field and wherein the fill rate generator is configured to receive, as the flow rate indicator, a historic yield map and a geographic location, heading, and speed of the harvester and generate an estimated flow rate of material through the harvester based on the historic yield map, the geographic location, heading, and speed of the harvester.

Example 11 is a method of controlling a mobile device on a first receiving vehicle, comprising:

receiving from a material loading vehicle, at a mobile application running on the mobile device, a cart fill parameter indicative of when a second receiving vehicle being filled by the material loading vehicle will reach a given fill level; and controlling a user interface display mechanism to generate a user interface output indicative of the cart fill parameter.

Example 12 is the method of any or all previous examples wherein the cart fill parameter comprises a fill time value indicative of a time when the second receiving vehicle will reach the given fill level and wherein controlling the user interface display mechanism comprises:

displaying a time value indicator indicative of the fill time value.

Example 13 is the method of any or all previous examples wherein the cart fill parameter comprises a fill location value indicative of a location where the second receiving vehicle will reach the given fill level and wherein controlling the user interface display mechanism comprises:

displaying a location value indicator indicative of the location value.

Example 14 is the method of any or all previous examples wherein displaying a location value comprises:

displaying a map display indicative of a location of the first receiving vehicle and the location indicated by the fill location value.

Example 15 is the method of any or all previous examples wherein displaying a map display comprises:

generating a route from the location of the first receiving vehicle to the location indicated by the fill location value; and displaying the route on the map display.

Example 16 is the method of any or all previous examples wherein the material loading vehicle comprises one of a plurality of different material loading vehicles operating at a worksite wherein receiving a cart fill parameter comprises receiving a different cart fill parameter 6 from each of the plurality of material loading vehicles and wherein controlling a user interface display mechanism to generate a user interface output indicative of the cart fill parameter comprises:

identifying one of the plurality of material loading vehicles based on a location of the second receiving vehicle, a location of each of the plurality of different receiving vehicles and the different cart fill parameters; and displaying the cart fill parameter received from the identified one of the material loading vehicles.

Example 17 is a computer implemented method of controlling a material loading vehicle, comprising:

sensing a fill level of material in a first receiving vehicle that is receiving material from the material loading vehicle;

generating a fill level sensor signal indicative of the sensed fill level of material in the first receiving vehicle;

detecting an overall fill level in the first receiving vehicle based on the fill level sensor signal;

generating an overall fill level sensor signal indicative of the overall fill level;

generating a fill parameter indicative of when the first receiving vehicle will reach a given fill level based on the overall fill level sensor signal; and communicating the fill parameter to a mobile application running on a mobile device in a second receiving vehicle.

Example 18 is the computer implemented method of any or all previous examples and further comprising:

receiving a flow rate indicator indicative of a volumetric flow rate of material through the material loading vehicle; and generating, based on the flow rate indicator, a fill rate indicator indicative of a rate at which the first receiving vehicle is being filled with the material from the loading vehicle.

Example 19 is the computer implemented method of any or all previous examples and further comprising:

detecting a flow of material through the material loading vehicle; and generating, as the flow rate indicator, a flow sensor signal indicative of the sensed flow of material through the material loading vehicle.

Example 20 is the computer implemented method of any or all previous examples and further comprising:

capturing an image of a worksite;

generating a camera signal indicative of the captured image;

generating an estimated volumetric flow rate of material through the material loading vehicle based on the camera signal; and generating the fill rate indicator based on the estimated volumetric flow rate of material through the material loading vehicle.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A material loading vehicle, comprising:

a material conveyance subsystem that conveys material from the material loading vehicle to a first receiving vehicle through a spout;

a fill sensor that generates a fill level sensor signal indicative of a fill level of material in the first receiving vehicle;

at least one processor; and memory storing instructions executable by the at least one processor, wherein the instructions, when executed, cause the material loading vehicle to:

identify an overall fill level in the first receiving vehicle based on the fill level sensor signal and generate an overall fill level sensor signal indicative of the overall fill level in the first receiving vehicle;

generate a first receiving vehicle fill location parameter indicative of a location where the first receiving vehicle will reach a given fill level based on the overall fill level sensor signal; and communicate, to a mobile application running on a mobile device in a second receiving vehicle, the first receiving vehicle fill location parameter indicative of the location where the first receiving vehicle will reach the given fill level.

2. The material loading vehicle of claim 1, wherein the instructions, when executed, cause the material loading vehicle to:

receive a flow rate indicator indicative of a volumetric flow rate of material through the material loading vehicle, and generate, based on the flow rate indicator, a fill rate indicator indicative of a rate at which the first receiving vehicle is being filled with the material from the material loading vehicle.

3. The material loading vehicle of claim 2, wherein the instructions, when executed, cause the material loading vehicle to:

generate, as a first receiving vehicle fill time parameter, a value indicative of a time when the first receiving vehicle will reach the given fill level; and communicate, to the mobile application running on the mobile device in the second receiving vehicle, the first receiving vehicle fill time parameter indicative of the time when the first receiving vehicle will reach the given fill level.

4. The material loading vehicle of claim 2, wherein the material loading vehicle comprises one of a plurality of material loading vehicles operating at a worksite, and wherein the instructions, when executed, cause the material loading vehicle to:

generate, as a portion of the first receiving vehicle fill location parameter, a loading vehicle indicator that uniquely identifies the material loading vehicle among the plurality of material loading vehicles operating at the worksite.

5. The material loading vehicle of claim 2 and further comprising:

a flow sensor configured to sense a flow of material through the material loading vehicle and generate, as the flow rate indicator, a flow sensor signal indicative of the sensed flow of material through the material loading vehicle.

6. The material loading vehicle of claim 2, wherein the instructions, when executed, cause the material loading vehicle to aggregate historic fill rate values to obtain, as the flow rate indicator, an aggregated fill rate value and to generate the fill rate indicator based on the aggregated fill rate value.

7. The material loading vehicle of claim 2, wherein the material loading vehicle comprises a harvester operating in a field and wherein the instructions, when executed, cause the material loading vehicle to:

receive, as the flow rate indicator, historic yield data that identifies historic yields at a plurality of areas of the field, and a geographic location, a heading, and a speed of the harvester; and generate an estimated flow rate of material through the harvester based on the historic yield data, the geographic location, the heading, and the speed of the harvester.

8. The material loading vehicle of claim 1 and further comprising:

a forward looking camera configured to capture an image of a worksite ahead of the material loading vehicle in a path of the material loading vehicle, and generate a camera signal indicative of the captured image.

9. The material loading vehicle of claim 8, wherein the instructions, when executed, cause the material loading vehicle to generate an estimated volumetric flow rate of material through the material loading vehicle based on the camera signal and to generate a fill rate indicator based on the estimated volumetric flow rate of material through the material loading vehicle.

10. The material loading vehicle of claim 1, wherein the instructions, when executed, cause the material loading vehicle to:

aggregate historic fill rate values for the first receiving vehicle to obtain an aggregated fill rate value; and generate the first receiving vehicle fill location parameter based on the overall fill level sensor signal and the aggregated fill rate value.

11. A material loading system comprising:

a material conveyance subsystem configured to convey material from a material loading vehicle to a first receiving vehicle through a spout;

a fill sensor configured to generate a fill level sensor signal indicative of a fill level of material in the first receiving vehicle;

a fill level detector configured to identify a fill level in the first receiving vehicle based on the fill level sensor signal;

a fill parameter generator configured to generate a first receiving vehicle fill parameter relative to a given fill level of the first receiving vehicle; and a communication system that communicates the first receiving vehicle fill parameter to a mobile application running on a mobile device in a second receiving vehicle in the material loading system, wherein the mobile application is configured to:

receive a plurality of different fill parameters, wherein each respective fill parameter of the plurality of different fill parameters:

corresponds to a respective material loading vehicle of a plurality of different material loading vehicles, and indicates at least one of:

a respective fill location where a respective receiving vehicle, being filled by the respective material loading vehicle, will reach a respective given fill level, or a respective fill time when the respective receiving vehicle will reach the respective given fill level;

identify a particular material loading vehicle, of the plurality of different material loading vehicles, based on:

a location of the second receiving vehicle, a respective location of each of the plurality of different material loading vehicles, and the plurality of different fill parameters; and display the respective fill parameter received from the particular material loading vehicle, wherein the mobile application is configured to:

receive the first receiving vehicle fill parameter; and control a user interface display mechanism to generate a user interface output indicative of the first receiving vehicle fill parameter, wherein the first receiving vehicle fill parameter comprises a fill location value indicative of a first fill location where the first receiving vehicle will reach the given fill level, and wherein the mobile application running on the mobile device in the second receiving vehicle is configured to:

display a location value indicator indicative of the first fill location.

12. The material loading system of claim 11, wherein the mobile application running on the mobile device in the second receiving vehicle is configured to:

display a map display indicative of the location of the second receiving vehicle and the first fill location.

13. The material loading system of claim 12, wherein the map display indicates a route from the location of the second receiving vehicle to the first fill location.

* * * * *